US 8,204,103 B1

(12) United States Patent
Sarrigeorgidis

(10) Patent No.: US 8,204,103 B1
(45) Date of Patent: *Jun. 19, 2012

(54) SCALABLE EQUALIZER FOR MULTIPLE-IN-MULTIPLE-OUT (MIMO) WIRELESS TRANSMISSION

(75) Inventor: Konstantinos Sarrigeorgidis, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/178,333

(22) Filed: Jul. 7, 2011

Related U.S. Application Data

(63) Continuation of application No. 11/222,490, filed on Sep. 7, 2005, now Pat. No. 7,978,759.

(60) Provisional application No. 60/672,003, filed on Apr. 15, 2005, provisional application No. 60/665,616, filed on Mar. 24, 2005, provisional application No. 60/713,520, filed on Aug. 24, 2005.

(51) Int. Cl.
*H03H 7/30* (2006.01)
*H03H 7/40* (2006.01)
*H03K 5/159* (2006.01)

(52) U.S. Cl. ........ 375/232; 375/231; 375/260; 375/349; 375/350; 708/320; 708/323

(58) Field of Classification Search .......... 375/229–233, 375/259–260, 267, 340, 346–349; 367/137–138; 342/451, 464; 708/100, 200, 300, 320–323
See application file for complete search history.

(56) References Cited

U.S. PATENT DOCUMENTS

| | | | | |
|---|---|---|---|---|
| 5,630,154 | A * | 5/1997 | Bolstad et al. | 712/19 |
| 5,852,630 | A * | 12/1998 | Langberg et al. | 375/219 |
| 6,600,796 | B1 * | 7/2003 | Hassibi | 375/347 |
| 6,760,374 | B1 * | 7/2004 | Tapp et al. | 375/233 |
| 7,616,695 | B1 * | 11/2009 | Sarrigeorgidis | 375/260 |
| 2002/0021770 | A1 * | 2/2002 | Beerel et al. | 375/340 |
| 2003/0003863 | A1 * | 1/2003 | Thielecke et al. | 455/39 |
| 2003/0020651 | A1 * | 1/2003 | Crilly et al. | 342/378 |
| 2004/0165684 | A1 * | 8/2004 | Ketchum et al. | 375/343 |
| 2004/0181419 | A1 * | 9/2004 | Davis et al. | 705/1 |
| 2004/0192218 | A1 * | 9/2004 | Oprea | 455/73 |
| 2005/0040822 | A1 * | 2/2005 | Heaton | 324/307 |
| 2005/0084028 | A1 * | 4/2005 | Yu et al. | 375/267 |
| 2005/0141624 | A1 * | 6/2005 | Lakshmipathi et al. | 375/260 |
| 2005/0174927 | A1 * | 8/2005 | Stephens et al. | 370/206 |

(Continued)

OTHER PUBLICATIONS

"Ordering", Merriam-Webster Online Dictionary, [Online] [Retrieved on Nov. 8, 2009]; Retrieved from the Internet at URL: http://www.merriam-webster.com/dictionary/ordering, 2009.

(Continued)

*Primary Examiner* — David C. Payne
*Assistant Examiner* — James M Perez

(57) ABSTRACT

Systems and techniques relating to processing information received from a spatially diverse transmission. In some implementations, an apparatus includes an input configured to receive data that has been transmitted over a wireless channel using multiple transmit antennas, $n_t$, and multiple receive antennas, $n_r$; and an equalizer responsive to multiple data streams corresponding to the multiple receive antennas and configured to generate an equalization matrix, $G_{n_r \times n_r}$, using a kernel matrix order updated from $n_{(t-i)} \times n_{(r-j)}$ to $n_t \times n_r$, the kernel matrix updates being distributed across preamble processing operations. The input can be responsive to a selectable number of at least four antennas in an orthogonal frequency division multiplexed (OFDM) multiple-in-multiple-out (MIMO) system, and the equalizer can be configured to distribute the kernel matrix updates across multiple training fields of data preambles.

20 Claims, 19 Drawing Sheets

U.S. PATENT DOCUMENTS

| | | | | |
|---|---|---|---|---|
| 2005/0245197 | A1* | 11/2005 | Kadous et al. | 455/67.13 |
| 2005/0249302 | A1* | 11/2005 | Leshem et al. | 375/267 |
| 2005/0249303 | A1* | 11/2005 | Takano | 375/267 |
| 2005/0276347 | A1* | 12/2005 | Mujtaba et al. | 375/299 |
| 2006/0072692 | A1* | 4/2006 | Gifford et al. | 375/350 |
| 2006/0074290 | A1* | 4/2006 | Chen et al. | 600/407 |
| 2006/0182206 | A1* | 8/2006 | Coon et al. | 375/346 |
| 2006/0227893 | A1* | 10/2006 | Bar-Ness et al. | 375/267 |
| 2007/0117527 | A1* | 5/2007 | Xu et al. | 455/127.4 |
| 2007/0253476 | A1* | 11/2007 | Tirkkonen et al. | 375/230 |
| 2007/0258538 | A1* | 11/2007 | Wight | 375/267 |
| 2008/0108310 | A1* | 5/2008 | Tong et al. | 455/69 |
| 2008/0112504 | A1* | 5/2008 | Jiang et al. | 375/296 |
| 2008/0170533 | A1* | 7/2008 | Cyzs et al. | 370/315 |
| 2008/0285670 | A1* | 11/2008 | Walton et al. | 375/260 |
| 2008/0317141 | A1* | 12/2008 | Burg et al. | 375/260 |
| 2009/0041153 | A1* | 2/2009 | Kamerman et al. | 375/267 |

OTHER PUBLICATIONS

"Part 11: Wireless LAN Medium Access Control (MAC) and Physical Layer (PHY) Specifications," Telecommunications and Information Exchange Between Systems—Local and Metropolitan Area Networks—Specific Requirements, Aug. 20, 1999, IEEE 802.11, ISO/IEC 8802-11.

"Part 11: Wireless LAN Medium Access Control (MAC) and Physical Layer (PHY) specifications: High-speed Physical Layer in the 5 GHz Band," Sep. 16, 1999, IEEE 802.11a, Supplement to IEEE Standard for Information Technology—Telecommunications and Information Exchange Between Systems—Local and Metropolitan Area Networks—Specific Requirements.

"Part 11: Wireless LAN Medium Access Control (MAC) and Physical Layer (PHY) Specifications: High-speed Physical Layer Extension in the 2.4 GHz Band," Sep. 16, 1999, IEEE 802.11b, Supplement to IEEE Standard for Information Technology—Telecommunications and Information Exchange Between Systems—Local and Metropolitan Area Networks—Specific Requirements.

"Part 11: Wireless LAN Medium Access Control (MAC) and Physical Layer (PHY) specifications: Further Higher Data Rate Extension in the 2.4 GHz Band," Apr. 2003, IEEE 802.11g/D8.2, Draft Supplement to IEEE Standard for Information Technology—Telecommunications and Information Exchange Between Systems—Local and Metropolitan Area Networks—Specific Requirements.

"Part 16: Air Interface for Fixed Broadband Wireless Access Systems", Oct. 1, 2004, IEEE 802.16, IEEE Standard for Local and Metropolitan Area Networks.

"System Requirements for IEEE 802.20 Mobile Broadband Wireless Access Systems—Version 14," Jul. 16, 2004, IEEE 802.20-PD-06, Draft 802.20 Permanent Document.

"Wireless LANs —TGn Sync Proposal Technical Specification: Syed Aon Mujtaba," May 18, 2005, IEEE 802.11n-04/0889r6.

Gesbert, et al., "From Theory to Practice: An Overview of MIMO Space-Time Coded Wireless Systems,", Apr. 2003, IEEE Journal on Selected Areas in Communications, vol. 21, No. 3.

Golub et al., "Matrix Computations," 1996, The Johns Hopkins University Press, 3d Ed., Chapter 5, pp. 206-274.

Golub et al., "Matrix Computations", 1996, The John Hopkins University Press, 3rd Edition, Chapter 5.

Sarrigeorgidis et al., "Unified computational approach for multimode multiple-in-multiple-out (MIMO) receivers," U.S. Appl. No. 11/316,522, filed Dec. 21, 2005, 109 pages.

Sarrigeorgidis, K., "MIMO Equalizer Design: An Algorithmic Perspective", U.S. Appl. No. 12/608,926, filed Oct. 29, 2009, 35 pages.

* cited by examiner

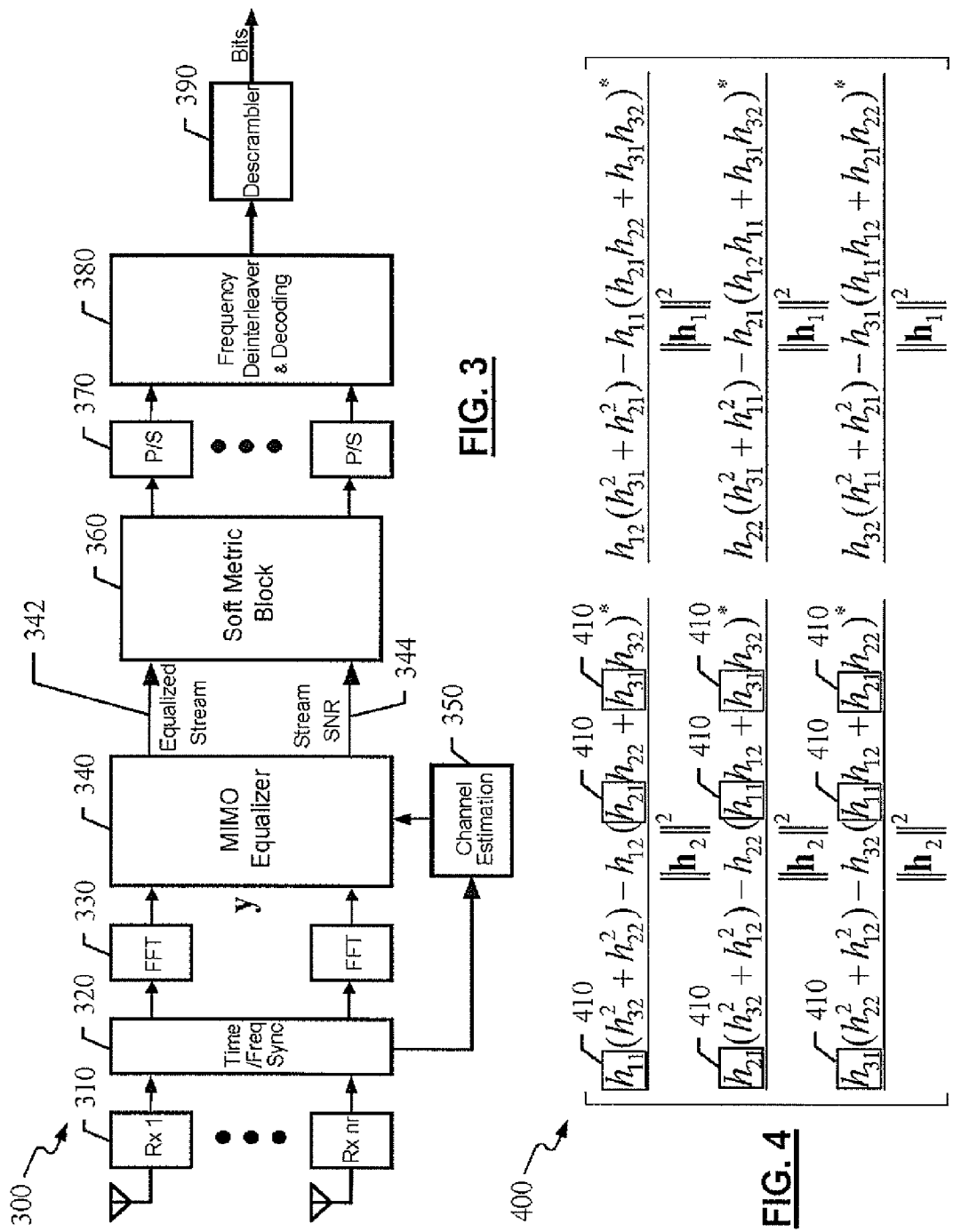

- Perform QR decomposition on H column by column
- Let k denote the kth LTF preamble
- For k=2 initialize the kernel matrices $P, \hat{R}$ compute $c_1 = c$
- For k=3 DO
  - Compute from CORDIC rotations the 3rd column of R
  - Compute $\alpha_1$
  - Update $r_{33}^2 c_1 + |\alpha_1|^2 \to c_1$
  - Update P as follows $r_{33} \begin{bmatrix} P & 0 \\ 0 & 1 \end{bmatrix} \to P$
  - Update $\hat{R}$ as follows $\begin{bmatrix} r_{33}\hat{R} & a_1 \\ 0 & -r_{2,3} \\ & 1 \end{bmatrix} \to \hat{R}$
  - Compute $c_2 = r_{33}^2 \cdot 1 + |r_{23}|^2$
  - Compute $P\hat{D}$
  - Compute $W_{ll} = PD = P \cdot (P\hat{D})$
  - Compute $G = P\hat{D}\hat{R}$ (A)

- For k=2 initialize the kernel matrices $P, \hat{R}$ compute $c_1$
- For k=3 DO (A)
- For k=4 DO
    - Compute from CORDIC rotations the 4th column of R
    - Update $\alpha_1$, compute $\alpha_2$
    - Update $r_{44}^2 c_1 + |\alpha_1|^2 \to c_1$, $r_{44}^2 c_2 + |\alpha_2|^2 \to c_2$
    - Update P as follows $r_{44} \begin{bmatrix} P & 0 \\ 0 & 1 \end{bmatrix} \to P$
    - Update $\hat{R}$ as follows $\begin{bmatrix} r_{44}\hat{R} & \alpha_1 \\ 0 & \alpha_2 \\ & -r_{34} \\ & 1 \end{bmatrix} \to \hat{R}$
    - Compute $c_3 = r_{44}^2 \cdot 1 + |r_{34}|^2$
    - Compute $P\hat{D}$
    - Compute $W_{ll} = P\hat{D}$
    - Compute $G = P\hat{D}R$

FIG. 11

SCALABLE EQUALIZER FOR MULTIPLE-IN-MULTIPLE-OUT (MIMO) WIRELESS TRANSMISSION

CROSS REFERENCE TO RELATED APPLICATIONS

This present disclosure is a continuation of U.S. application Ser. No. 11/222,490, filed on Sep. 7, 2005, which claims priority under 35 U.S.C. §119(e) to U.S. Provisional Application No. 60/665,616, filed on Mar. 24, 2005; U.S. Provisional Application No. 60/672,003, filed Apr. 15, 2005; and U.S. Provisional Application No. 60/713,520, filed Aug. 24, 2005.

BACKGROUND

The present disclosure describes systems and techniques relating to processing information received from a spatially diverse transmission.

Mobile phones, laptops, personal digital assistants (PDAs), base stations and other systems and devices can wireless transmit and receive data. Such systems and devices have used orthogonal frequency division multiplexing (OFDM) transmission schemes, such as those defined in the Institute of Electrical and Electronics Engineers (IEEE) 802 wireless communications standards. The IEEE 802 standards include IEEE 802.11a, 802.11g, 802.11n, and 802.16. In an OFDM system, in particular, a data stream is split into multiple substreams, each of which is sent over a different subcarrier frequency (also referred to as a tone or frequency tone).

Some wireless communication systems use a single-in-single-out (SISO) transmission approach, where both the transmitter and the receiver use a single antenna. Other wireless communication systems use a multiple-in-multiple-out (MIMO) transmission approach, where multiple spatially separated transmit antennas and multiple spatially separated receive antennas are used to improve data rates, link quality or both. This is known as antenna diversity, spatial diversity or spatially diverse transmission.

In addition to spatial diversity, many wireless communication systems also use time diversity and frequency diversity to improve system performance. Data streams can be encoded using channel encoders of different rates and with different amounts of redundancies, and the encoded data streams can be interleaved to separate adjacent coded bits. At the receiver, the channel is estimated and equalized, and bit-streams that have been corrupted during transmission over the wireless channel are combined using error correction techniques to reconstruct the original information in the data bit-streams.

SUMMARY

The present disclosure includes systems and techniques relating to processing information received from a spatially diverse transmission. According to an aspect of the described systems and techniques, an apparatus includes an input configured to receive data that has been transmitted over a wireless channel using multiple transmit antennas, $n_t$, and multiple receive antennas, $n_r$; and an equalizer responsive to multiple data streams corresponding to the multiple receive antennas and configured to generate an equalization matrix, $G_{n_r \times n_r}$, using a kernel matrix order updated from $n_{(t-i)} \times n_{(r-j)}$ to $n_t \times n_r$, the kernel matrix updates being distributed across preamble processing operations. The input can be responsive to a selectable number of at least four antennas in an orthogonal frequency division multiplexed (OFDM) multiple-in-multiple-out (MIMO) system, and the equalizer can be configured to distribute the kernel matrix updates across multiple training fields of data preambles.

The equalizer can include coordinate rotation digital computer (CORDIC) processors configured to perform Givens rotations on a channel response matrix; memory configured to store equalization matrices, including $G_{n_r \times n_r}$; first processing units configured to update the kernel matrix; and second processing units configured to generate the equalization matrix, $G_{n_r \times n_r}$. The Givens rotations can be scheduled on the CORDIC processors to intersperse calculations of $\phi$ and $\theta$ angles. The memory can include a Q matrix memory and a G matrix memory.

The CORDIC processors can include six CORDIC processors configured to operate as a single CORDIC pipeline when the multiple data streams are a first number of data streams and configured to operate as dual, parallel CORDIC pipelines when the multiple data streams are a second number of data streams less than the first number. The second processing units can be configured to be used both during preamble processing to generate the equalization matrix, G, and during data processing to perform G matrix equalization, $\hat{x}=G \cdot z$.

Furthermore, t and r can be integers greater than three, and i and j can be integers greater than one. The equalizer can be arranged to be reconfigurable to handle the multiple data streams changing from a first number of data streams to a second number of data streams.

According to another aspect of the described systems and techniques, a method includes obtaining a received signal that was transmitted over a wireless channel using spatially diverse transmission, the received signal comprising multiple subcarriers; and recursively computing a signal-to-noise-ratio (SNR) of the received signal while receiving channel response information of the wireless channel derived from the received signal. The recursively computing can include recursively updating a diagonal kernel matrix, and the method can further include generating an equalization matrix from the recursively updated diagonal kernel matrix, the equalization matrix being useable in equalizing the received signal across the multiple subcarriers.

The method can also include receiving the channel response information including a channel response matrix; performing a QR decomposition of the channel response matrix; recursively updating an upper triangular kernel matrix; and the generating the equalization matrix can include generating the equalization matrix from the recursively updated diagonal kernel matrix and the recursively updated upper triangular kernel matrix. The performing the QR decomposition and the generating the equalization matrix can occur during preamble processing of the received signal. The method can further include storing a matrix, Q, resulting from the QR decomposition, in memory; storing the equalization matrix, G, in memory; and performing data field processing comprising Q matrix equalization, $z=Q^*y$, and G matrix equalization, $\hat{x}=G \cdot z$.

The performing the QR decomposition can include using a coordinate rotation digital computer (CORDIC) module. The recursively updating the kernel matrices can include distributing processing of the kernel matrices across tone preambles of an orthogonal frequency division multiplexed (OFDM) multiple-in-multiple-out (MIMO) constellation. The obtaining the received signal can include receiving multiple data streams over the wireless channel with multiple antennas; and processing the received data streams in compliance with an IEEE 802.11n wireless communication standard to generate the received signal.

The described systems and techniques can be implemented in electronic circuitry, computer hardware, firmware, software, or in combinations of them, such as the structural means disclosed in this specification and structural equivalents thereof. This can include a software program operable to cause one or more machines (e.g., a signal processing device) to perform operations described. Thus, program implementations can be realized from a disclosed method, system, or apparatus, and apparatus implementations can be realized from a disclosed system, program, or method. Similarly, method implementations can be realized from a disclosed system, program, or apparatus, and system implementations can be realized from a disclosed method, program, or apparatus.

For example, the disclosed embodiment(s) below can be implemented in various systems and apparatus, including, but not limited to, a special purpose programmable machine (e.g., a wireless access point, a router, a switch, a remote environment monitor), a mobile data processing machine (e.g., a wireless client, a cellular telephone, a personal digital assistant (PDA), a mobile computer, a digital camera), a general purpose data processing machine (e.g., a minicomputer, a server, a mainframe, a supercomputer), or combinations of these.

Thus, according to another aspect of the described systems and techniques, a system can include a first device including a first wireless transceiver and multiple antennas; and a second device including a second wireless transceiver and multiple antennas, the second device being a mobile device operable to communicate with the first device over a wireless channel. The second wireless transceiver can include an input configured to receive data that has been transmitted over a wireless channel using multiple transmit antennas, $n_t$, and multiple receive antennas, $n_r$; and an equalizer responsive to multiple data streams corresponding to the multiple receive antennas and configured to generate an equalization matrix, $G_{n_r \times n_r}$, using a kernel matrix order updated from $n_{(t-i)} \times n_{(r-j)}$ to $n_t \times n_r$, the kernel matrix updates being distributed across preamble processing operations.

According to yet another aspect of the described systems and techniques, an apparatus includes input means for receiving data that has been transmitted over a wireless channel using multiple transmit antennas, $n_t$, and multiple receive antennas, $n_r$; and means for generating, responsive to multiple data streams corresponding to the multiple receive antennas, an equalization matrix, $G_{n_r \times n_r}$, using a kernel matrix order updated from $n_{(t-i)} \times n_{(r-j)}$ to $n_t \times n_r$, the kernel matrix updates being distributed across preamble processing operations. The input means can be responsive to a selectable number of at least four antennas in an orthogonal frequency division multiplexed (OFDM) multiple-in-multiple-out (MIMO) system, and the means for generating can be include means for distributing the kernel matrix updates across multiple training fields of data preambles.

The means for generating can include coordinate rotation digital computer (CORDIC) processor means for performing Givens rotations on a channel response matrix; memory means for storing equalization matrices, including $G_{n_r \times n_r}$; first processing means for updating the kernel matrix; and second processing means for generating the equalization matrix, $G_{n_r \times n_r}$. The Givens rotations can be scheduled on the CORDIC processor means to intersperse calculations of $\phi$ and $\theta$ angles. The memory means can include memory means for storing a Q matrix and memory means for storing a G matrix.

The CORDIC processor means can include means for operating multiple CORDIC processors as a single CORDIC pipeline when the multiple data streams are a first number of data streams and for operating the multiple CORDIC processors as dual, parallel CORDIC pipelines when the multiple data streams are a second number of data streams less than the first number. The second processing means can include means for operating both during preamble processing to generate the equalization matrix, G, and during data processing to perform G matrix equalization, $\hat{x} = G \cdot z$.

Furthermore, t and r can be integers greater than three, and i and j can be integers greater than one. The means for generating the equalization matrix can include reconfiguration means for handling the multiple data streams changing from a first number of data streams to a second number of data streams.

The described systems and techniques can result in a computational framework for an equalizer in a MIMO system that is readily scalable to the number of transmit/receive antennas. This computational framework can result in a hardware architecture that is both scalable and reconfigurable. Computations can be distributed across Long Training Fields (LTFs), allowing computation of an equalizer matrix to begin after the first LTF. System performance can be improved, and the complexity of device implementation can be reduced.

Details of one or more implementations are set forth in the accompanying drawings and the description below. Other features, objects and advantages may be apparent from the description and drawings, and from the claims.

DRAWING DESCRIPTIONS

FIG. 3 is a block diagram showing an example receiver as can be used in a wireless communication system.

FIG. 4 shows an equalizer matrix in a 2×3 MIMO system according to a direct approach to the MIMO equalizer architecture.

FIG. 10 shows example pseudo-code for computing the G matrix for 3×3 MIMO.

FIG. 11 shows example pseudo-code for computing the G matrix for 4×4 MIMO.

Like reference symbols in the various drawings indicate like elements.

DETAILED DESCRIPTION

The systems and techniques described herein can be implemented as one or more devices, such as one or more integrated circuit (IC) devices, in a wireless communication device. For example, the systems and techniques disclosed can be implemented in a wireless local area network (WLAN) transceiver device (e.g., a WLAN chipset) suitable for use in an OFDM MIMO system.

Figure 1:
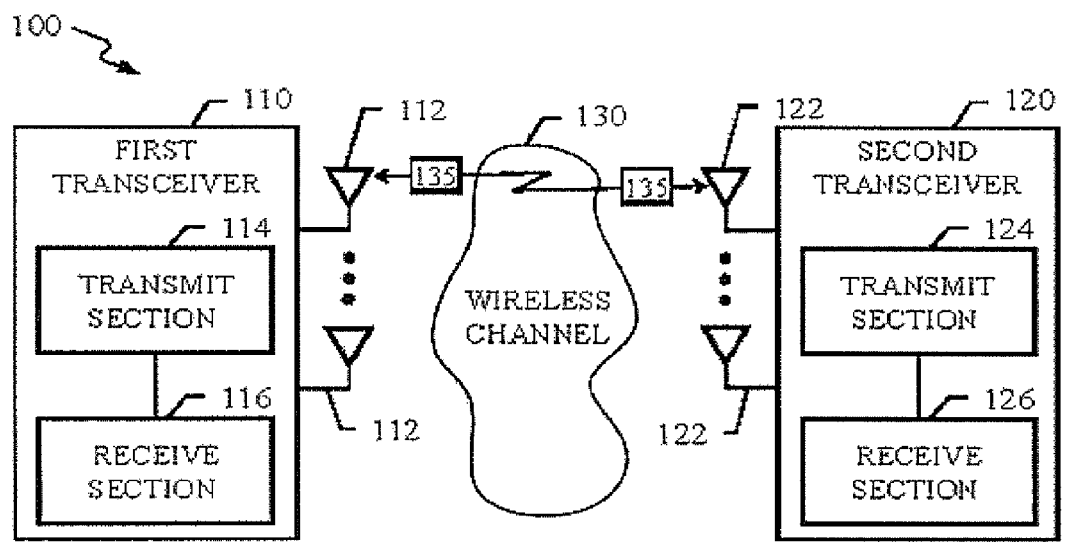
FIG. 1 is a block diagram showing a communication system.

FIG. 1 is a block diagram showing a communication system 100 that employs spatially diverse transmission over a wireless channel 130. The communication system 100 is a multiple-in-multiple-out (MIMO) orthogonal frequency division multiplexed (OFDM) system. A first transceiver 110 has multiple antennas 112, and a second transceiver 120 has multiple antennas 122. In some implementations, the system 100 can dynamically change the number of data streams transmitted over the spatially separated antennas 112 to alter transmission robustness and transmission data rate as needed.

The transceiver 110 includes a transmit section 114 and a receive section 116, and the transceiver 120 includes a transmit section 124 and a receive section 126. The transceivers 110, 120 are sometimes referred to as transmitters and receivers for convenience, with the understanding that the systems and techniques described are applicable to wireless systems that use dedicated transmitters and receivers as well as transceivers generally. Moreover, a wireless transceiver employing the systems and techniques described can be included in any communication device, regardless of whether that device is a fixed device (e.g., a base station or a personal desktop computer) or a mobile device (e.g., a mobile phone or PDA).

Packetized information transmission involves the transmission of information over the wireless channel 130 in the form of discrete sections of information 135, often referred to as packets or frames. The wireless channel 130 can be a radio frequency (RF) channel, and the transceivers 110, 120 can be implemented to comply with one or more of the IEEE 802 wireless standards (including IEEE 802.11, 802.11a, 802.11b, 802.11g, 802.11n, 802.16, and 802.20).

In general, wireless channels are typically affected by two dominant phenomena (among others) known as fading and multipath effects. These two effects are typically random and time varying, and determine the receiver-signal-to-noise ratio (Rx-SNR). Signal processing techniques for recovering transmitted signals in light of these effects are well known. For example, in 802.11a/g wireless systems, the OFDM modulation mechanism is used, and predefined training symbols are included in the preambles of data frames for use in estimating characteristics of the wireless channel in order to equalize the channel.

In an OFDM modulation approach, the channel bandwidth is divided into narrow slices called tones, and symbols from a constellation (e.g., from a quadrature-amplitude modulated (QAM) constellation) are transmitted over the tones. For example, in IEEE 802.11a systems, OFDM symbols include 64 tones (with 48 active data tones) indexed as {−32, −31, . . . , −1, 0, 1, . . . , 30, 31}, where 0 is the DC tone index. The DC tone is typically not used to transmit information.

In FIG. 1, the wireless channel 130 has a channel response matrix, H, which represents the reflections and multi-paths in the wireless medium, which may affect channel quality. The system can perform channel estimation using known training sequences which are transmitted periodically (e.g., at the start of each frame). A training sequence may include one or more pilot symbols, i.e., OFDM symbols including only pilot information (which is known a priori at the receiver) on the tones. The pilot symbol(s) can be inserted in front of each transmitted frame. The receiver can use the known values to estimate the medium characteristics of the frequency tones used for data transmission. For example, on the receiver side, the signal $y_i$ for tone i can be written as, $y_i = H_i x_i + z_i$, where $H_i$ is the channel response for the i-th tone, $x_i$ the symbol vector transmitted on the i-th tone, and $z_i$ the additive noise. The receiver can estimate the transmitted signal vector $x_i$ for the i-th tone from the received signal $y_i$ and the channel response $H_i$. For an IEEE 802.11a OFDM system, the channel response $H_i$ is a scalar value provided by the channel estimation module, whereas in a MIMO-OFDM system, the frequency domain channel response $H_i$ is an $n_r \times n_t$ matrix.

The number of independent data streams transmitted by the transmit antennas is called the "multiplexing order" or "spatial multiplexing rate" ($r_S$). A spatial multiplexing rate of $r_S=1$ indicates pure diversity, and a spatial multiplexing rate of $r_S = \min(M_R, M_T)$ (minimum number of receive or transmit antennas) indicates pure multiplexing.

In some embodiments, the MIMO system 100 can use combinations of diversity and spatial multiplexing, e.g., $1 \leq r_S \leq \min(M_R, M_T)$. For example, in a 4×4 MIMO system, the system may select one of four available multiplexing rates ($r_S \in [1,2,3,4]$) depending on the channel conditions. The system can thus change the spatial multiplexing rate as channel conditions change.

Figure 2:
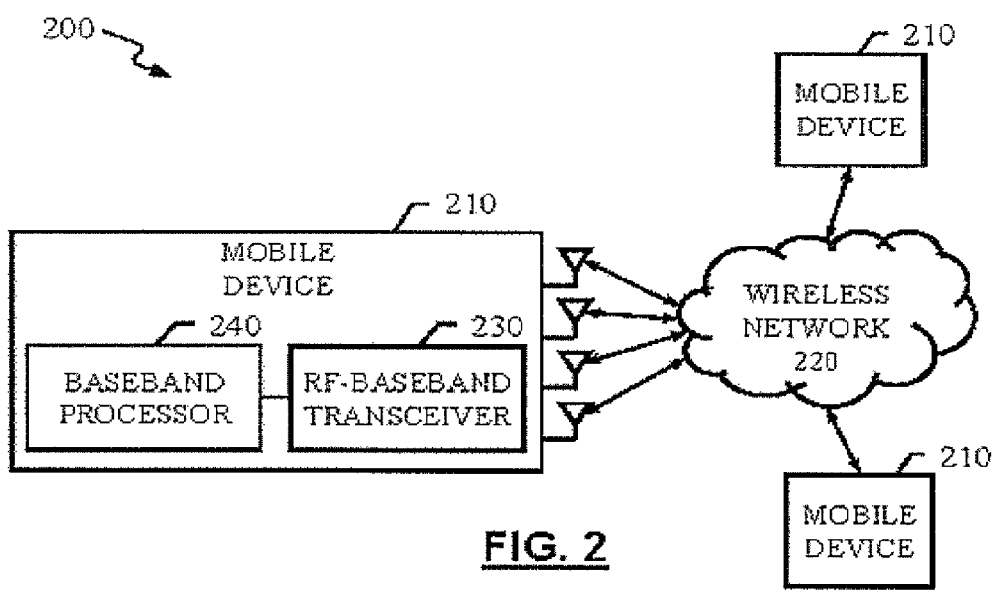
FIG. 2 is a block diagram showing a mobile device communication system.

FIG. 2 is a block diagram showing a mobile device communication system 200 that can employ spatially diverse transmission over a wireless network 220. The system 200 includes multiple mobile devices 210 operable to communicate with each other over the wireless network 220.

A mobile device 210 includes an RF-baseband transceiver 230 and a baseband processor 240. The transmit section and the receive section of the mobile device 210 can be spread across the RF-baseband transceiver 230 and the baseband processor 240. Moreover, the RF-baseband transceiver 230 and the baseband processor 240 can be two integrated circuit (IC) devices in a WLAN chipset configured for use in the mobile device 210, or these two devices can be integrated onto a single IC chip.

FIG. 3 is a block diagram showing an example receiver 300 as can be used in a wireless communication system (e.g., the receive sections 116 and 126 from FIG. 1). The receiver 300 can include stages similar to those in an OFDM receiver (e.g., an IEEE 802.11a OFDM receiver), but with some modifications to account for the multiple receive antennas. The receiver 300 can include multiple processing chains corresponding to multiple receive antennas.

Signals received on the multiple receive antennas can be input to corresponding processing chains, which can include a radio-frequency (RF) module 310 for RF-to-baseband and analog-to-digital (A/D) conversion. The receiver may have a common automatic gain control (AGC) for all antennas to provide minimal gain across all the receive antennas. A time/frequency synchronization module 320 can perform synchronization operations and extract information from the multiple substreams for channel estimation 350.

The processing chains can include a fast Fourier transform (FFT) module 330, a MIMO equalizer 340, a soft metric block 360, and a parallel-to-serial (PIS) converter 370. The processing chains can include additional stages, components or both (not shown), such as a cyclic prefix removal module, a serial-to-parallel (SIP) converter, a common phase error (CPE) correction module, and a space-frequency detection module. The multiple substreams can be input to a space-frequency deinterleaver and decoding module 380, which can de-interleave the substreams into a single data stream and perform soft (e.g., soft Viterbi) decoding. The single stream can then be input to a descrambler 390 to generate the output bits.

The communication system 100 described above, and particularly a MIMO-OFDM system, may be compatible with IEEE 802.11a systems. The MIMO-OFDM system may use 52 tones (48 data tones and 4 pilot tones), 312.5 kHz subcarrier spacing, an FFT/inverse FFT (IFFT) period of 3.2 μs, a cyclic prefix with a duration of 0.8 μs, and an OFDM symbol duration of 4.0 μs.

The MIMO equalizer 340 can remove inter-stream interference for each spatial stream. Per-stream equalization can be done by projecting a received vector to a space orthogonal to the stream's spatial interference subspace followed by matched filtering with its spatial signature. The receiver 300 can use the channel response matrix H to generate a zero-forcing (ZF) equalizer matrix and estimate the transmitted signal by pseudo-inverting the channel for each subcarrier and computing the signal-to-noise ratio (SNR) per substream.

Decorrelator (or ZF) receivers can be used in Code Division Multiple Access (CDMA) multiuser detection. The decorrelator for the k-th stream corresponds to the k-th row of the pseudo-inverse of the channel matrix, H. Thus, for every tone, an SNR stream 344 can be computed by, $$W_{ll} = 1/\text{diag}(H^*H)^{-1}, \quad (1)$$

and an equalized stream 342 can be computed by, $$\hat{x} = W_{ll}(H^*H)^{-1}H^* \cdot y \quad (2)$$

where $H \in C^{nr \times nt}$

In assessing ZF receiver performance, the MIMO received signal can be represented as:

$$y = h_k x_k + \sum^{i \neq k} h_i x_i + n = h_k x_k + ISI + \text{noise}. \quad (3)$$

Letting the stream of interest be the k-th one, the received signal can be projected onto a subspace orthogonal to the vectors $h_{i \neq k}$. This projection can be denoted by $Q_k$. The received SNR is then proportional to a $\|Q_k h_k\|_2 = W_{ll}(k) = 1/[H^*H]_{kk}^{-1}$. The diversity order of the projected signature is $n_r - n_t + 1$ ($n_r$ being the number of receive antennas and $n_t$ being the number of transmit antennas). The received SNR is given by $$SNR_k = \frac{E_s}{n_t N_o} \cdot \|Q_k h_k\|^2.$$

The array gain is given by $E[P_{RX}/P_{TX}]=nr-nt+1$.

ZF decomposes the MIMO channel into $n_t$ parallel streams. Each stream has a $n_r-n_t+1$ diversity order and a $10 \log(n_r-n_t+1)$ array gain. Thus, ZF can trade off degrees of freedom and diversity. This can be compared with a $n_r$ diversity order by using maximal (ML) decoding. Therefore, a ZF equalizer may be considered a suboptimum equalizer architecture. For a $n_t \times n_r$ MIMO system, in a pure spatial multiplexing mode, the received streams are typically Rayleigh distributed. Thus, in this scenario there is no spatial diversity or array gain. However, a ZF equalizer may provide the best tradeoff between performance and hardware complexity.

The MIMO equalizer 340 can be constructed using a readily scaleable architecture, such as described in detail below. In general, consider a $n_r$ by $n_t$ MIMO system with channel matrix H. The equalizer 340 computes the following quantities:

$$\hat{x}_i = \frac{1}{(H^* \cdot H)_{ii}^{-1}} (H^* \cdot H)^{-1} \cdot H^* \cdot y = W \cdot y, \quad 1 \leq i \leq n_t \quad (4)$$

$$W_{\|,i} = \frac{1}{(H^* \cdot H)_{ii}^{-1}} \quad 1 \leq i \leq n_i \quad (5)$$

The channel matrix H can be estimated column by column by processing the long training fields (LTFs). In this case, the complete channel matrix H is not known until the last LTF has been processed, but the equalizer 340 would traditionally need the complete channel matrix H to compute the quantities for equalization. Waiting until the last LTF is processed is generally undesirable, as this can result in strict hardware and timing requirements.

In part to provide a scaleable architecture, the MIMO equalizer 340 can employ order recursive computation, where the solution is computed recursively from a smaller channel matrix H. Channel estimation can be performed, such as where each LTF computes a column of the channel matrix, and order recursive computation can performed per LTF processing. By updating the equalization matrix computations during LTF processing, hardware requirements can be relaxed, and the equalization matrix generation can be distributed over time. Using this computational framework, a scalable equalizer architecture can be provided that supports multiple MIMO configurations. For example, the receiver 300 can be configured to support any matrix size up to a 4×4 matrix.

In order to clearly present the new computational framework, an alternative direct approach is first discussed. Considering a 2×2 system, let the channel matrix be $$H = \begin{bmatrix} h_{11} & h_{12} \\ h_{21} & h_{22} \end{bmatrix},$$

and the equalizer matrix be $$W = \frac{1}{\text{diag}(H^* \cdot H)^{-1}} (H^* \cdot H)^{-1} \cdot H^*.$$

The equalizer coefficients using a direct method can then be computed as follows:

$$W = (h_{11}h_{22} - h_{12}h_{21})^* \begin{bmatrix} \frac{1}{(h_{22}^2 + h_{12}^2)} & 0 \\ 0 & \frac{1}{(h_{11}^2 + h_{21}^2)} \end{bmatrix} \begin{bmatrix} h_{22} & -h_{12} \\ -h_{21} & h_{11} \end{bmatrix}. \quad (6)$$

This is a likely implementation choice if only a 2×2 system is of interest.

However, when this approach is scaled to a 2×3 system, letting the channel matrix be $$H = \begin{bmatrix} h_{11} & h_{12} \\ h_{21} & h_{22} \\ h_{31} & h_{32} \end{bmatrix} = [h_1 \ h_2],$$

then the equalizer matrix W is given by matrix 400 shown in FIG. 4. As can be seen, the structure of this equalizer matrix is different from the structure of the 2×2 equalizer matrix), and thus configuring the architecture to support both a 2×2 and 2×3 mode may be problematic. This direct approach essentially breaks down for 3×3 MIMO and 4×4 MIMO systems, where the equalizer computation has $O(n^3)$ complexity. For example, an analytical expression of the ZF equalizer coefficients for a 4×4 MIMO system, found using the MATHEMATICA® software package, was 10 pages in length. Moreover, the boxed elements 410 in FIG. 4 are estimated during the first LTF. As can be seen in this example, the equalizer matrix computations cannot be started unless the second LTF is received and processed. Thus, the computation cannot be readily distributed in time.

A more scalable approach can include inverting a matrix by partitioning. For example, $C=(H^* \cdot H)^{-1}$ can be computed first. Then, the inverse of C can be computed recursively by the inverse of its submatrices. However, this inverse by partitioning approach may have its own disadvantages: the inverse operator requires the multiplication of two matrices, which doubles the condition number and could result in numerical issues for ill conditioned matrices. Moreover, distributing the processing in time across the LTFs is not straightforward in this case.

The systems and techniques described here can enable distributed processing across LTFs and recursive computation of an equalizer matrix. The present approach can employ QR decomposition based equalization. The QR decomposition of H can be computed, $Q^*H=R$, and the equalization matrix G can be computed as follows: $G=W_{ZF}R^{-1}$. The k-th substream SNR can be computed as the reciprocal of the norm of the k-th row of the inverse of the upper triangular matrix R. During data computation, $z=Q^*y$, and finally the equalized vector can be given by $\hat{x}=Gz$, where G is an upper triangular matrix. For additional details on QR decomposition, see U.S. patent application Ser. No. 10/944,144, filed Sep. 16, 2004 and entitled "MIMO Equalizer Design: An Algorithmic Perspective".

For the 2×2 case of QR decomposition in SM MIMO, the equalized vector is given by:

$$\hat{x} = G \cdot Q_{2 \times 2}^* y = \begin{bmatrix} r_{11} r_{22}^2 / c & -r_{12} r_{11} r_{22} / c \\ 0 & r_{22} \end{bmatrix} Q_{2 \times 2}^* y \quad (7)$$

For the 2×3 case, the equalized vector is given by:

$$\hat{x} = G \cdot Q_{2 \times 3}^* y = \begin{bmatrix} r_{11} r_{22}^2 / c & -r_{12} r_{11} r_{22} / c \\ 0 & r_{22} \end{bmatrix} Q_{2 \times 3}^* y \quad (8)$$

where the $r_{ij}$ elements result from the QR decomposition of the channel matrix. As can be seen, the G matrices are the same for 2×2 and 2×3, and the CORDIC based Givens rotations captured in the Q matrices can be configured to support the 2×2 and 2×3 modes. Therefore, a QR based equalization approach can be a more promising solution when scalability and configurability is a design issue.

Figure 5:
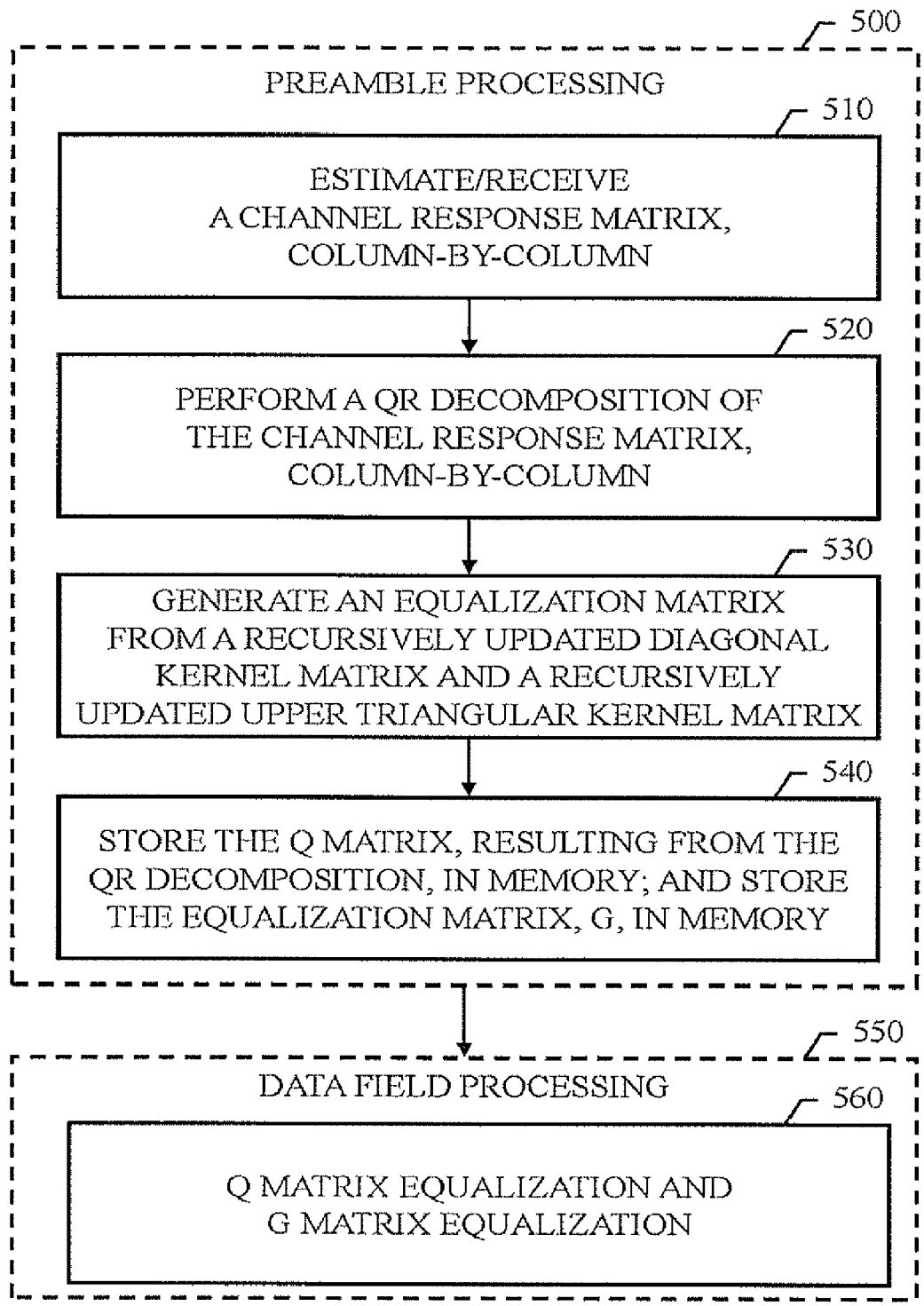
FIG. 5 is a flowchart showing example data processing in a MIMO equalizer of a receiver in a wireless communication system.

FIG. 5 is a flowchart showing example data processing in a MIMO equalizer of a receiver in a wireless communication system. A received signal, which was transmitted over a wireless channel using spatially diverse transmission, is first obtained (either directly or indirectly). The received signal includes multiple subcarriers and can be processed in two main stages: preamble processing 500 and data field processing 550.

During preamble processing 500, a channel response matrix can be received or estimated, column-by-column, at 510 (e.g., by channel estimator 350). A QR decomposition of the channel response matrix can be performed, column-by-column, at 520 (e.g., by MIMO equalizer 340, 2700). An equalization matrix can be generated from a recursively updated diagonal kernel matrix and a recursively updated upper triangular kernel matrix at 530 (e.g., by MIMO equalizer 340, 2700). A matrix, Q, resulting from the QR decomposition, and the equalization matrix, G, can be stored in memory at 540 (e.g., by MIMO equalizer 340, 2700).

The QR decomposition can be performed using Householder reflections, a modified Gram-Schmidt method (see G. Golub, "Matrix Computations"), or CORDIC based Givens rotations (see U.S. patent application Ser. No. 10/944,144, filed Sep. 16, 2004 and entitled "MIMO Equalizer Design: An Algorithmic Perspective"). However, certain advantages may be realized by using CORDIC based QR decomposition. For example, the amount of Q memory can be reduced for a nxn system with respect to that needed for a Gram-Schmidt implementation.

The resulting orthogonal matrix Q computed by using the Gram-Schmidt algorithm uses $2n_r \times n_t$ variables for its representation. However, since Q is an orthonormal matrix, it can be seen that the total number of independent variables needed to construct Q is given by $2 n_r n_t - n_t^2$. The Gram-Scmidt algorithm is not capable of removing the inherent redundancy inside the Q matrix resulting in increased memory and computational requirements. Assuming a channel matrix, $H \in C^{n_r \times n_t}$, it can be seen that the number of CORDIC angles required to decompose the channel matrix to its triangular form is given by $$\left\{ \sum_{i=0}^{n_t-1} (2n_r - (2i+1)) \right\}_Q = 2n_r n_t - n_t^2.$$

That is, the CORDIC based QR decomposition minimizes the amount of free variables needed to construct the matrix Q. Yet, the number of computations used in the equalization step $Q^*y$ is significantly reduced by using CORDIC Givens rotations instead of Gram-Schmidt. The number of real computations for Q matrix equalization can be reduced from $4n_t n_r$ (GS based) to $3n_t n_r - n$, $(3n_t+1)/2$ (CORDIC based). For a 4×4 system, there can be up to a 65% reduction in computations by employing CORDIC QR.

The following table summarizes the memory savings of the proposed QR method across different MEMO configurations.

| MIMO MODE | 2 × 2 | 2 × 3 | 3 × 3 | 3 × 4 | 4 × 4 |
|---|---|---|---|---|---|
| Q GS DOF: $2n_t n_r$ | 8 | 12 | 18 | 24 | 32 |
| Q CORDIC DOF: $2n_r \cdot n_t - n_t^2$ | 4 | 8 | 9 | 15 | 16 |
| Memory Savings with QR CORDIC | 50% | 33% | 50% | 37% | 50% |

Thus, memory requirements for Q storage can be reduced across different spatial diversity MIMO configurations by employing a QR CORDIC implementation.

Storing both matrices Q and R does not double the memory requirements with respect to just storing the channel matrix H. When the channel matrix is $H \in C^{nr \times nt}$, the DOF of the channel are $2n_r n_t$. The DOF of the GS based QR are $\{2n_t n_r\}_Q + \{n_t^2\}_R$. The DOF of the CORDIC based QR are $$\left\{\sum_{i=0}^{nt-1}(2n_r - (2i+1))\right\}_Q + \{n_t^2\}_R = 2n_t n_r.$$

Thus, storing Q & R generally incurs no memory increase with respect to just storing the channel matrix H.

An intuitive way of understanding the redundancy in the Q matrix is to recall that the elementary Givens rotations are given by $$Q = \begin{bmatrix} \cos\theta & \sin\theta \\ -\sin\theta & \cos\theta \end{bmatrix} \begin{bmatrix} e^{j\phi} & 0 \\ 0 & 1 \end{bmatrix} = \begin{bmatrix} e^{j\phi}\cos\theta & \sin\theta \\ -e^{j\phi}\sin\theta & \cos\theta \end{bmatrix}.$$

In the GS method, all the resulting elements of this matrix may be stored. By just storing the angle $\theta$, the redundancy of storing both $\cos\theta$ and $\sin\theta$ can be avoided. The same applies for the angle $\phi$ as well.

The G matrix is given by $G = W_{ll} \cdot R^{-1}$. The diagonal entries of the G matrix are real numbers, and the memory requirements (e.g., in words of memory) for storing G can thus be $$\left\{n_t + \frac{n_t(n_t-1)}{2} 2\right\}_G = n_t^2.$$

The storage requirements for storing SNRs can be $n_t$ (same as the number of spatial streams).

| MIMO MODE | 2 × 2 | 2 × 3 | 3 × 3 | 3 × 4 | 4 × 4 |
|---|---|---|---|---|---|
| G Degrees of Freedom | 4 | 4 | 9 | 9 | 16 |
| Substream SNRs | 2 | 2 | 3 | 3 | 4 |
| G & $W_{\parallel}$ Memory | 6 | 6 | 12 | 12 | 20 |
| Increase from 2 × 2 mode | | 0% | 100% | 100% | 233% |

During data field processing 550, Q matrix equalization, $z = Q^* y$, and G matrix equalization, $\hat{x} = G \cdot z$, can be performed at 560 (e.g., by MIMO equalizer 340, 2700). The Q and G matrix equalization use the saved Q and G matrices. GS based Q matrix equalization can involve $n_r \times n_t$ complex multiplications or $4n_r n_t$ real multiply operations. The number of real CORDIC operations for CORDIC based Q matrix equalization can be given by:

$$\sum_{i=0}^{nt-1}[2(n_r - i - 1) + (n_r - i)] = 3n_r n_t - n_t(3n_t + 1)/2 \quad (9)$$

Again, this can result in significant computational savings in comparison with GS based Q matrix equalization (e.g., up to a 67% savings). This can also result in a reduced area for multipliers (e.g., due data field decoding), and a potentially significant decrease in energy dissipation during data decoding.

Figure 6:
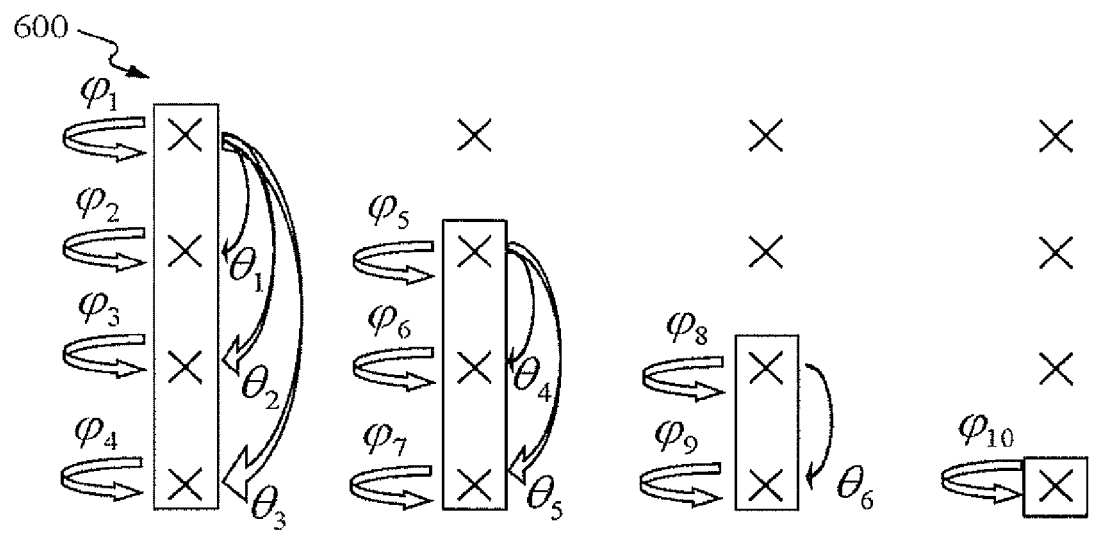
FIG. 6 shows Givens rotations operations on an example 4×4 channel response matrix.

FIG. 6 shows Givens rotations operations 600 on an example 4×4 channel response matrix. The θ angles are 2 CORDIC operations (real & imaginary). The $\phi$ angles are 1 CORDIC operation. The total CORDIC operations here are then given by $3n_r n_t - n_t(3n_t+1)/2 = 22$.

Figure 7:
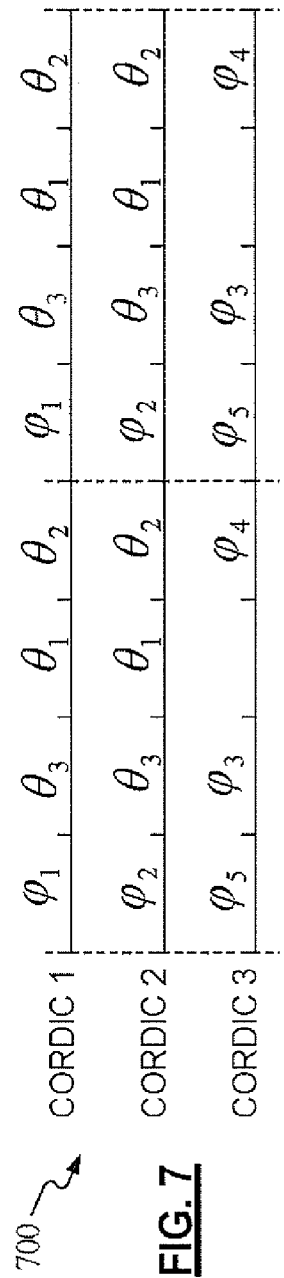
FIG. 7 shows example CORDIC scheduling for a 2×3 MIMO mode.

FIG. 7 shows example CORDIC scheduling 700 for a 2×3 MIMO mode. In some implementations, the equalizer can operate at 160 megahertz (MHz), the CORDIC pipeline depth can be 12, and 3 CORDIC processors can be used in parallel to handle the 8 CORDIC angles in 2×3 MIMO. CORDIC equalization can involve tone block processing with 48/12=4 blocks of 12 tones for CORDIC processing. Based on the CORDIC scheduling, the CORDIC equalization latency can be 4×12×4+48=240 cycles. If the CORDIC clock is 160 MHz, this can result in a 1.5 □sec delay (20 MHz) and a 90% pipeline utilization.

Figure 8:
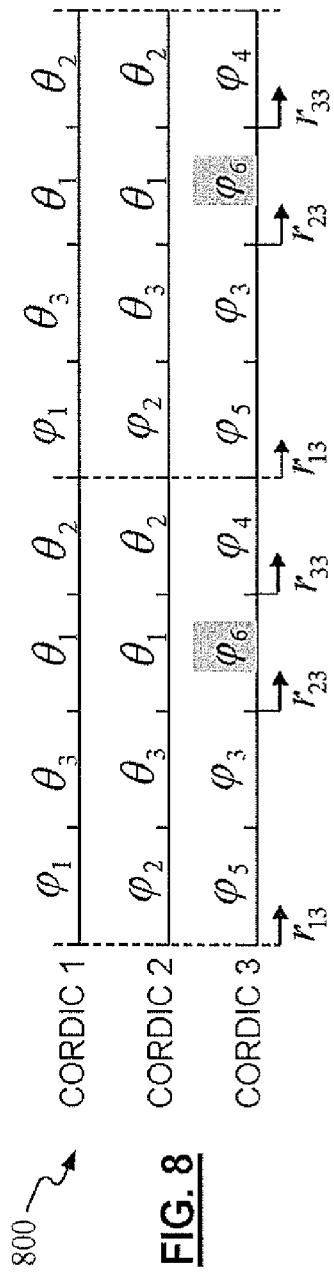
FIG. 8 shows example CORDIC scheduling for a 3×3 MIMO mode.

For a 3×3 MIMO mode, there are 9 CORDIC angles. The additional angle is used to make the entry (3,3) of the triangular matrix R a real number; this angle can be called $\phi_6$. From the CORDIC scheduling 700 for the 2×3 MIMO mode there is one empty slot. FIG. 8 shows example CORDIC scheduling 800 for the 3×3 MIMO mode. As shown, the 3 CORDIC processors are 100% utilized for the 3×3 MIMO mode. Again, the CORDIC clock can be 160 MHz, and this can result in a 1.5 □sec delay (20 MHz).

Figure 9:
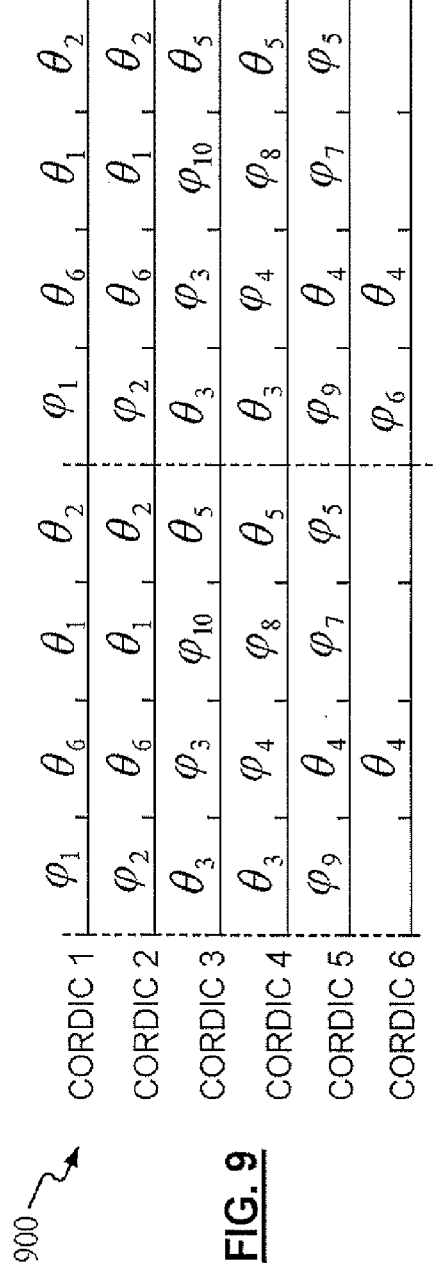
FIG. 9 shows example CORDIC scheduling for a 4×4 MIMO mode.

For a 4×4 MIMO mode, Q matrix equalization, there are 16 angles (see FIG. 6; $\phi_1 - \phi_{10}$ and $\theta_1 - \theta_6$). Keeping the same latency as for 2×3 and 3×3 (e.g., 1.5 □sec), FIG. 9 shows example CORDIC scheduling 900 for the 4×4 MIMO mode. The scheduling 900 uses 6 CORDIC pipelined processors. These can also be used for 3×4 MIMO Q matrix equalization, where there are 15 angles.

Returning now to preamble processing 500 from FIG. 5, computing the G matrix can be done during LTF processing. Recall that $G = W_{ll} R^{-1}$. The G matrix equalizer coefficients for the 2×2 MIMO mode can be written as:

$$G_{2 \times 2} = W_{ll} \cdot R_{2 \times 2}^{-1} = \begin{bmatrix} r_{11} r_{22}^2/c & -r_{12} r_{11} r_{22}/c \\ 0 & r_{22} \end{bmatrix}, \hat{x} = G \cdot z \quad (10)$$

The substream SNRs can be written as: $w_{l1} = r_{l1}^2 r_{l2}^2/c$, $w_{l2} = r_{22}^2$.

In order to develop the recursive method, two kernel matrices can be introduced as follows:

$$P = \begin{bmatrix} r_{11} & 0 \\ 0 & 1 \end{bmatrix}, \hat{R} = \begin{bmatrix} r_{22} & -r_{12} \\ 0 & 1 \end{bmatrix}.$$

P is a diagonal matrix, and $\hat{R}$ is an upper triangular matrix. Letting $c = r_{22}^2 + |r_{12}|^2$, an order recursive computational framework can be developed that calculates the coefficients of any equalizer Matrix G up to a predefined limit (e.g., up to 4×4), by recursively updating the two kernel matrices while minimizing the amount of extra computations that involve elements of the upper triangular matrix R.

A decomposition, $G = D \cdot \hat{R}$, is introduced; where D is a diagonal matrix, and $\hat{R}$ is upper triangular. Furthermore, D can be factored as follows: $D = P \cdot \hat{D}$; where P is diagonal (P and $\hat{R}$ being the kernel matrices). P can then be order recursively computed during the LTFs based on the kernel matrices, and $\hat{D}$ can be recursively computed during the LTFs based on the variable c.

The substream SNRs can be computed as $W_{ll} = PD = P \cdot [P\hat{D}]$. For example, for 2×2 and 2×3 MIMO:

$$G_{2 \times 2} = r_{22} \begin{bmatrix} r_{11} & 0 \\ 0 & 1 \end{bmatrix} \begin{bmatrix} 1/c & 0 \\ 0 & 1 \end{bmatrix} \begin{bmatrix} r_{22} & -r_{12} \\ 0 & 1 \end{bmatrix} = [P\hat{D}]\hat{R}, \quad (11)$$

where $P \rightarrow r_{22} P$ and $\hat{R} \rightarrow \hat{R}$. From this, it can be seen that $$W_{ll} = P[P\hat{D}] = \begin{bmatrix} r_{11}^2 r_{22}^2 / c \\ r_{22}^2 \end{bmatrix}.$$

Computing the G matrix coefficients for 3×3 MIMO can be done based on the following equation:

$$G_{3 \times 3} = W_{ll} \cdot \quad (12)$$

$$R_{3 \times 3}^{-1} = \begin{bmatrix} \dfrac{r_{11} r_{22}^2 r_{33}^2}{c_1} & \dfrac{-r_{11} r_{12} r_{22} r_{33}^2}{c_1} & \dfrac{r_{11} r_{22} r_{33} (r_{12} r_{23} - r_{13} r_{22})}{c_1} \\ 0 & \dfrac{r_{22} r_{33}^2}{c_2} & \dfrac{-r_{22} r_{23} r_{33}}{c_2} \\ 0 & 0 & r_{33} \end{bmatrix},$$

letting $u = [-r_{13}\ r_{23}]^T$, $v = [r_{22}\ r_{12}]^T$, and $\alpha_1 = v^T u$.

G can be decomposed as $G = D \cdot \hat{R}$, where the D matrix is given by $D = P \cdot \hat{D}$. The P matrix can be order updated using $$r_{33} \begin{bmatrix} P & 0 \\ 0 & 1 \end{bmatrix} \rightarrow P,$$

and the $\hat{D}$ matrix can be given by:

$$\hat{D} = \begin{bmatrix} 1/c_1 & 0 & 0 \\ 0 & 1/c_2 & 0 \\ 0 & 0 & 1 \end{bmatrix}, r_{33}^2 c + |\alpha_1|^2 \rightarrow c_1, c_2 = r_{33}^2 \cdot 1 + |r_{23}|^2 \quad (13)$$

The $\hat{R}$ matrix can be order updated using $$\begin{bmatrix} r_{33}\hat{R} & \alpha_1 \\ & -r_{23} \\ 0 & 1 \end{bmatrix} \rightarrow \hat{R}, \quad (14)$$

the equalizer matrix can be computed as $G_{3 \times 3} = D\hat{R}$, and the substream SNRs can be given by $$W_{ll} = P[P\hat{D}] = \begin{bmatrix} r_{11}^2 r_{22}^2 r_{33}^2 / c_1 \\ r_{22}^2 r_{33}^2 / c_2 \\ r_{33}^2 \end{bmatrix}.$$

The post CORDIC equalizer coefficients used in computing the G matrix for the 4×4 MIMO mode can be as follows:

$$\begin{bmatrix} \dfrac{r_{11} r_{22}^2 r_{33}^2 r_{44}^2}{c_1} & \dfrac{r_{11} r_{12} r_{22} r_{33}^2 r_{44}^2}{c_1} & \dfrac{r_{11} r_{12} r_{33}(r_{12} r_{23} - r_{13} r_{22}) r_{44}^2}{c_1} & \dfrac{-r_{11} r_{22} r_{33}(r_{33}(r_{24} r_{12} - r_{14} r_{22}) + r_{34}(r_{13} r_{22} - r_{12} r_{23})) r_{44}}{c_1} \\ 0 & \dfrac{r_{22}^2 r_{33}^2 r_{44}^2}{c_2} & \dfrac{r_{22} r_{23} r_{33} r_{44}^2}{c_2} & \dfrac{r_{22} r_{33} r_{44}(r_{23} r_{34} - r_{24} r_{33})}{c_2} \\ 0 & 0 & \dfrac{r_{33} r_{44}^2}{c_3} & \dfrac{-r_{33} r_{44} r_{34}}{c_3} \\ 0 & 0 & 0 & r_{44} \end{bmatrix}$$

updating $u = [r_{14}\ -r_{24}]$, $r_{33} v^T u + r_{34} \alpha_1 \rightarrow \alpha_1$, and letting $a_2 = r_{23} r_{34} - r_{24} r_{33}$. The c variables can be updated as $r_{44}^2 c_1 + |\alpha_1|^2 \rightarrow c_1$, $r_{44}^2 c_2 + |\alpha_2|^2 \rightarrow c_2$; letting $c_3 = r_{44}^2 + |r_{34}|^2$.

G can be decomposed as $G = D \cdot \hat{R}$, where the D matrix is given by $D = P \cdot \hat{D}$. The P matrix can be order updated using $$r_{44} \begin{bmatrix} P & 0 \\ 0 & 1 \end{bmatrix} \rightarrow P,$$

and the $\hat{D}$ matrix can be given by:

$$\theta \hat{D} = \text{diag}(1/c_1, 1/c_2, 1/c_3, 1) \quad (15)$$

The $\hat{R}$ matrix can be order updated using $$\begin{bmatrix} & & \alpha_1 \\ r_{44}\hat{R} & & a_2 \\ & 0 & -r_{34} \\ & & 1 \end{bmatrix} \rightarrow \hat{R}, \quad (16)$$

the equalizer matrix can be computed as $G_{4 \times 4} = D\hat{R}$, and the substream SNRs can be given by $W_{ll} = P[P\hat{D}]$.

Thus, the computation framework described herein can be understood as follows for some implementations: (1) QR decomposition on channel matrix H=QR; (2) compute equalization matrix Q*; (3) compute equalization matrix G=$W_{ll}R^{-1}$; decompose G as G=D$\hat{R}$, where D is diagonal; (4) present matrix D as D=P·$\hat{D}$; (5) order recursively compute the P matrix; (6) order recursively compute the $\hat{R}$, $\hat{D}$ matrices. As a result, the G matrix is computed recursively. The substream SNRs are given by $W_{ll}$=PD, which can be scaled with diagonal matrix P.

The computation framework described herein readily scales with changing numbers of transmit and receive antennas being used. Based on this computational framework, a configurable equalizer architecture can be built that supports multiple MIMO transmission modes up to a predefined limit (e.g., 4×4 MIMO). This equalizer architecture can result in improved receiver performance as the equalizer operations readily scale to more computations as the number of transmit and receive antennas change in a wireless communications system.

To further demonstrate this point, example implementations of the method and receiver architecture are shown and described in connection with FIGS. 10-27. FIG. 10 shows example pseudo-code 1000 for computing the G matrix for 3×3 MIMO. QR decomposition is performed on H column by column. Letting k denote the kth LTF preamble, for k=2, the kernel matrices (P and $\hat{R}$) are initialized and $c_1$ is computed. For k=3, the 3rd column of R is computed from CORDIC rotations, $\alpha_1$ is computed, $c_1$ is updated, the kernel matrices are updated, and then $c_2$, P$\hat{D}$, $W_{ll}$ and G are computed. FIG. 11 shows example pseudo-code 1100 for computing the G matrix for 4×4 MIMO. For the kernel matrices (P and $\hat{R}$) are initialized, and $c_1$ is computed. For k=3, as shown, a portion, A, of the computations for 3×3 MIMO are the same as those used for 4×4 MIMO, and the matrices can be recursively updated during LTF processing. For k=4, the 4th column of R is computed from CORDIC rotations, $\alpha_1$ is updated, $\alpha_2$ is computed, $c_1$ and $c_2$ are updated, the kernel matrices are updated, and then $c_3$, P$\hat{D}$, $W_{ll}$ and G are computed.

FIGS. 12-23 show example architecture and D-matrix processing for 2×2, 3×3 and 4×4 MIMO. As described above, the elements of the R matrices can be computed using CORDIC processors.

Figure 12:
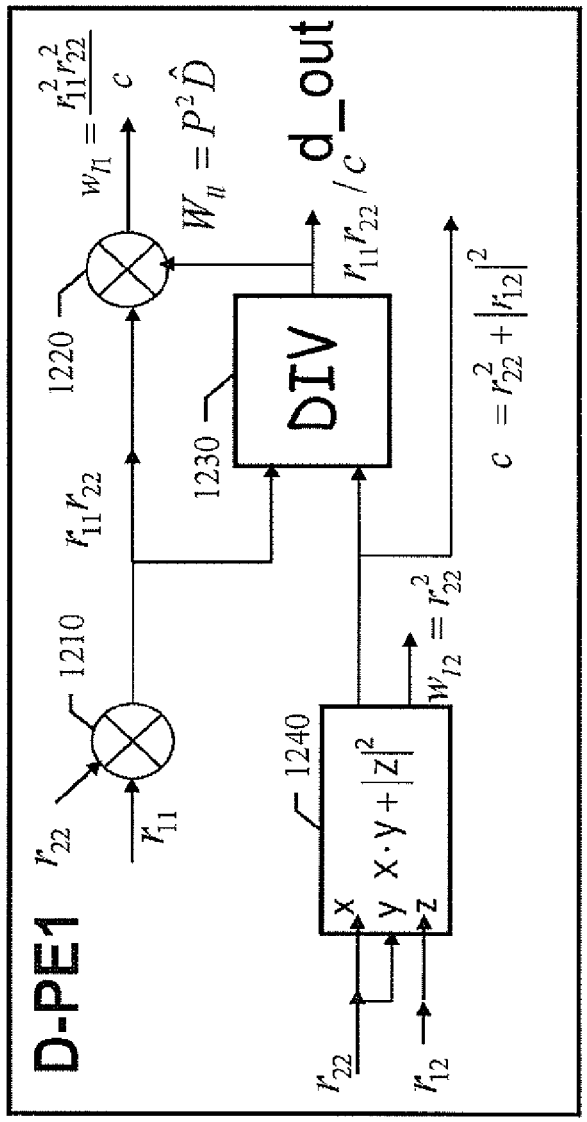
FIGS. 12-23 show example architecture and D-matrix processing for 2×2 MIMO, 3×3 MIMO and 4×4 MIMO.
Figure 13:
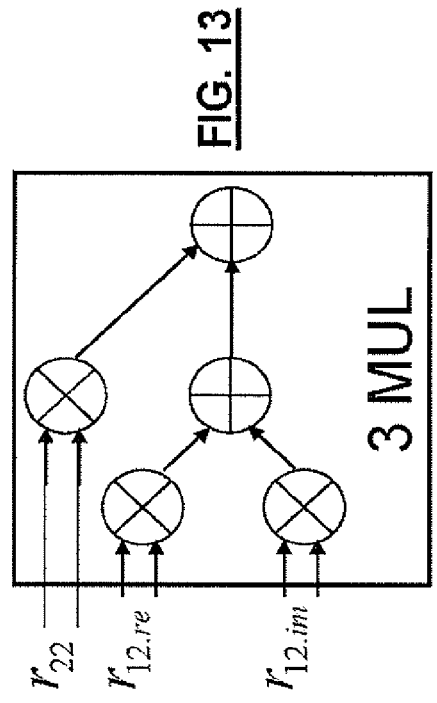

FIG. 12 shows example architecture and D-matrix processing during 2×2 MIMO. A first processing unit, D-PE1, processes the second column of $$R = \begin{bmatrix} r_{11} & r_{12} \\ & r_{22} \end{bmatrix} \quad (17)$$

to obtain d_out. The processing unit, D-PE1, includes two multipliers 1210 and 1220, a divider 1230 and a multiplier-adder unit 1240. FIG. 13 shows the multiplier-adder unit 1240 from FIG. 12 with inputs including real (re) and imaginary (im) components of $r_{12}$.

Figure 14:
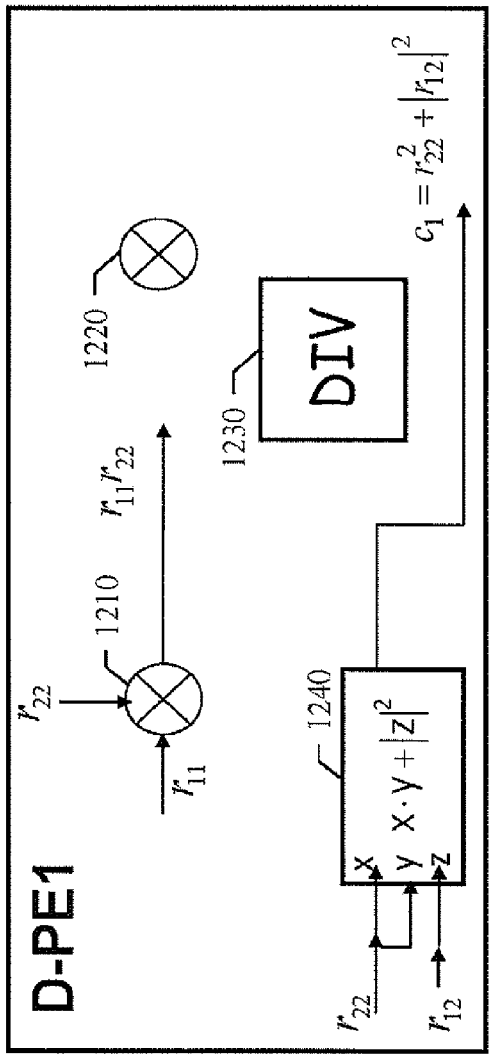

FIG. 14 shows D-matrix processing on D-PE1 during second preamble processing for 3×3 MIMO. During the second LTF, the second column of $$R = \begin{bmatrix} r_{11} & r_{12} & r_{13} \\ 0 & r_{22} & r_{23} \\ 0 & 0 & r_{33} \end{bmatrix} \quad (18)$$

can be processed to obtain $r_{11}r_{12}$ and $c_1$, which are stored in memory.

Figure 15:
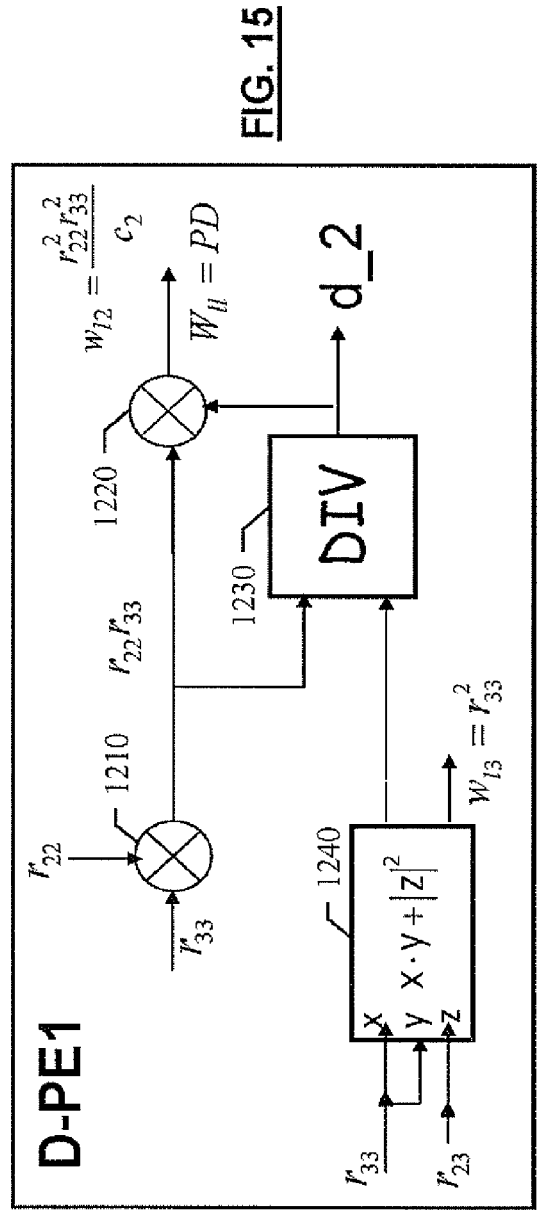

FIG. 15 shows D-matrix processing on D-PE1 during third preamble processing for 3×3 MIMO. During the third LTF, the third column of matrix R in equation (18) can be processed to obtain $w_{l2}$ and d__2 (the second diagonal element of D). Note that D-PE1 has been configured to use the multiplier 1220 and the divider 1230 as compared with the configuration in FIG. 14.

Figure 16:
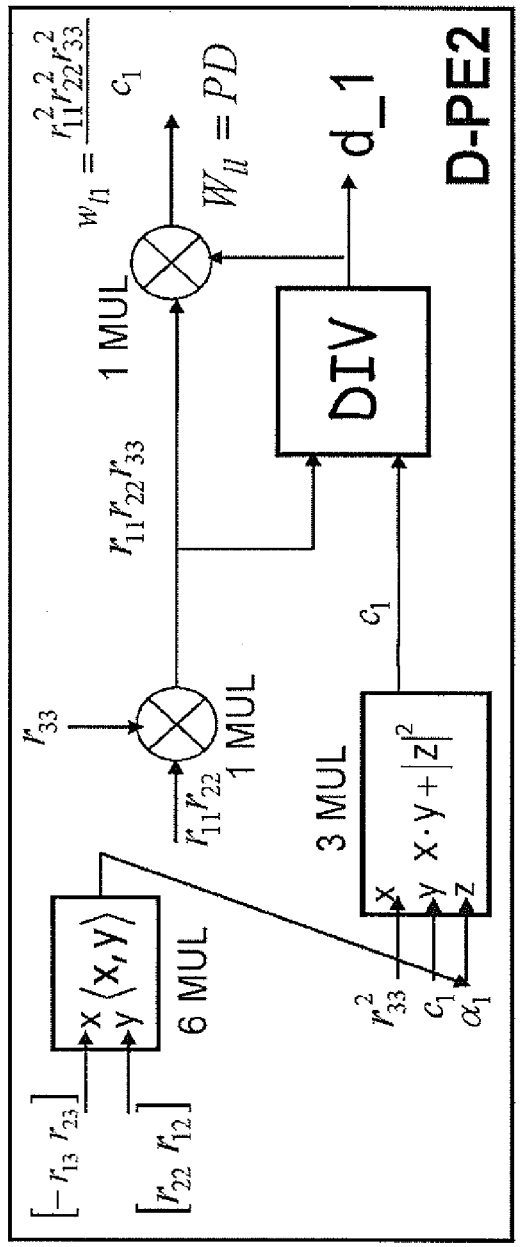
Figure 17:
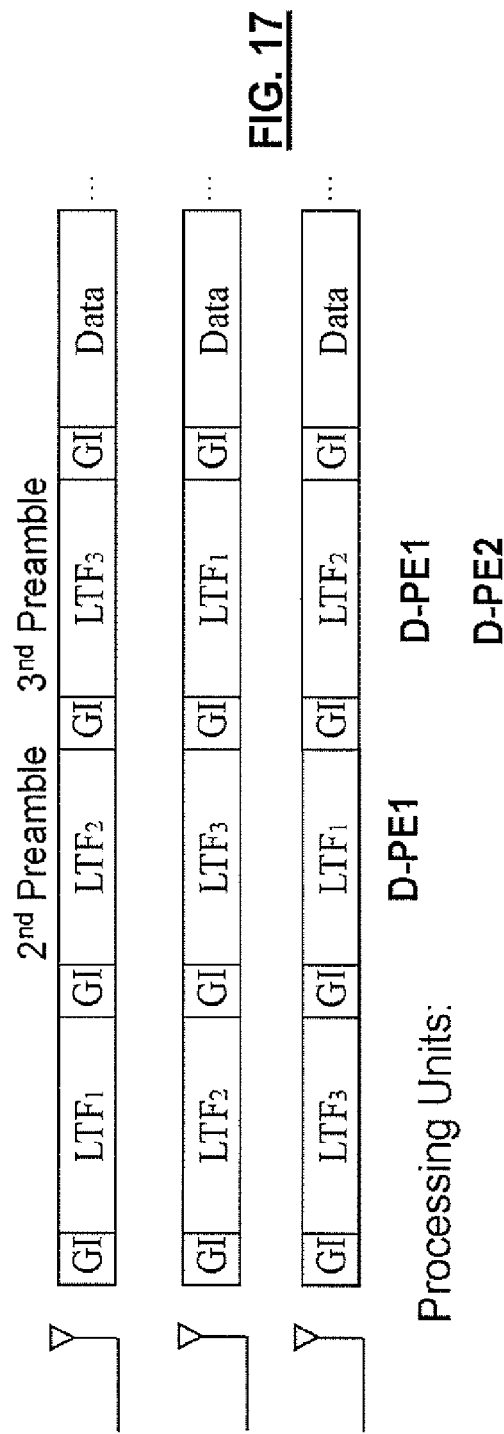

FIG. 16 shows D-matrix processing on a second processing unit, D-PE2, during the third preamble processing for 3×3 MIMO. D-PE2 can operate in parallel with D-PE1 during the third LTF. FIG. 17 shows three antennas and the operations in corresponding processing chains. As shown, two processing units, D-PE1 and D-PE2, are used for up to 3×3 MIMO.

These processing units perform distributed processing across the tone preambles, which can use tone interleaved HT-LTF in 3×3 MIMO. During the second preamble, four multiplies can be performed per tone (there can be 64 total tones, of which 48 tones can be processed here). For the second preamble processing, only the first processing unit, D-PE1, need be active. For the third preamble processing, the two processing units, D-PE1 and D-PE2, can operate in parallel and sixteen multiplies can be performed per tone.

For 4×4 MIMO, similar processing can be performed during the early LTFs as that done for 3×3 MIMO. Thus, FIG. 14 also shows D-matrix processing on D-PE1 during second preamble processing for 4×4 MIMO. During the second LTF, the second column of $$R = \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \quad (19)$$

can be processed to obtain $r_{11}r_{22}$ and $c_1$, which are stored in memory.

Figure 18:
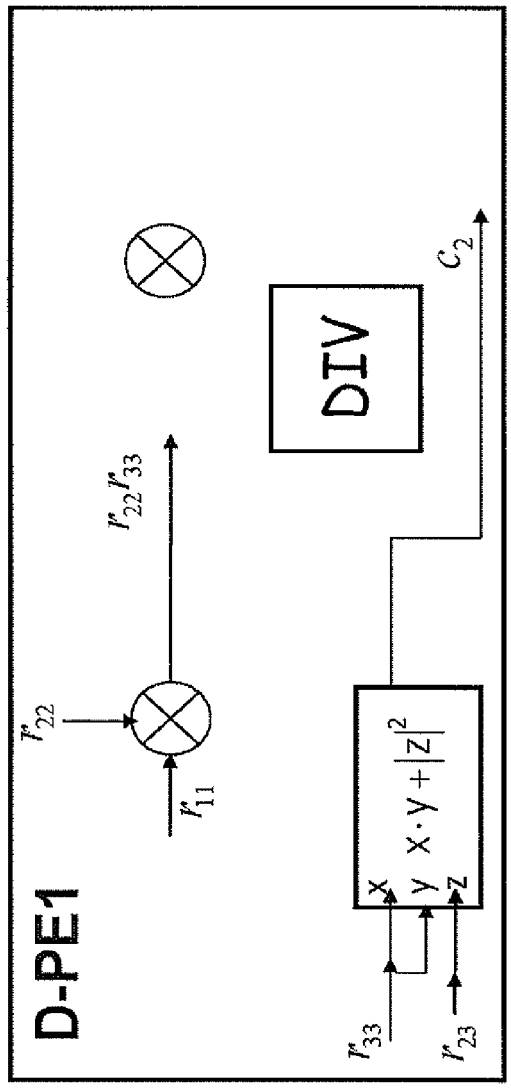

FIG. 18 shows D-matrix processing on D-PE1 during third preamble processing for 4×4 MIMO. During the third LTF, the third column of matrix R in equation (19) can be processed to obtain $r_{22}r_{33}$ and $c_2$. D-PE1 is here configured to store $r_{22}r_{33}$ and $c_2$ in memory.

Figure 19:
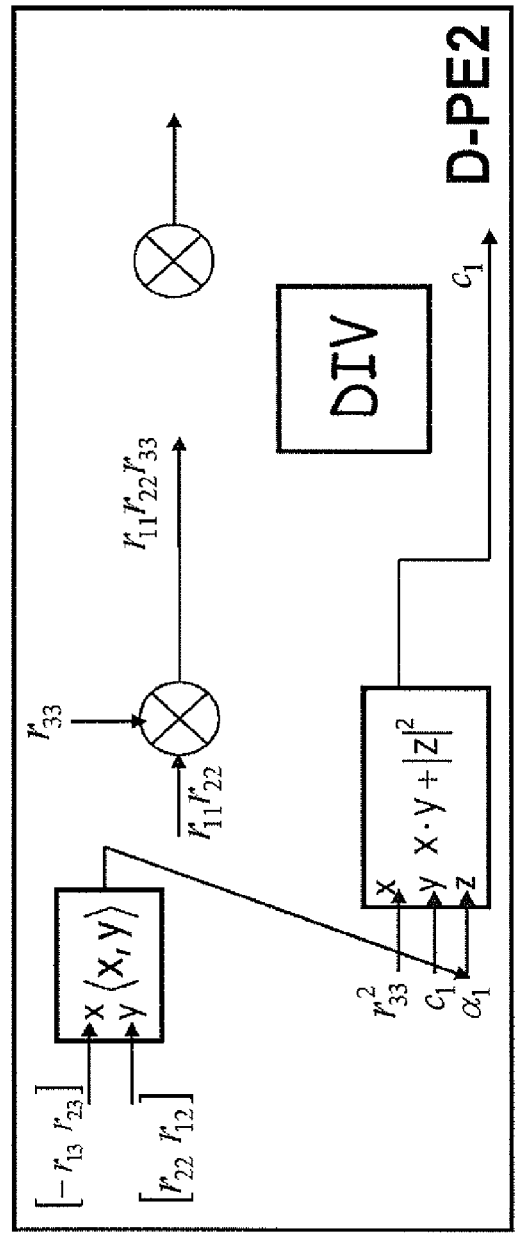

FIG. 19 shows D-matrix processing on D-PE2 during third preamble processing for 4×4 MIMO. During the third LTF, the third column of matrix R in equation (19) can be processed to obtain $r_{11}r_{22}r_{33}$ and $c_1$. D-PE2 is here configured to store $r_{11}r_{22}r_{33}$ and $c_1$ in memory.

Figure 20:
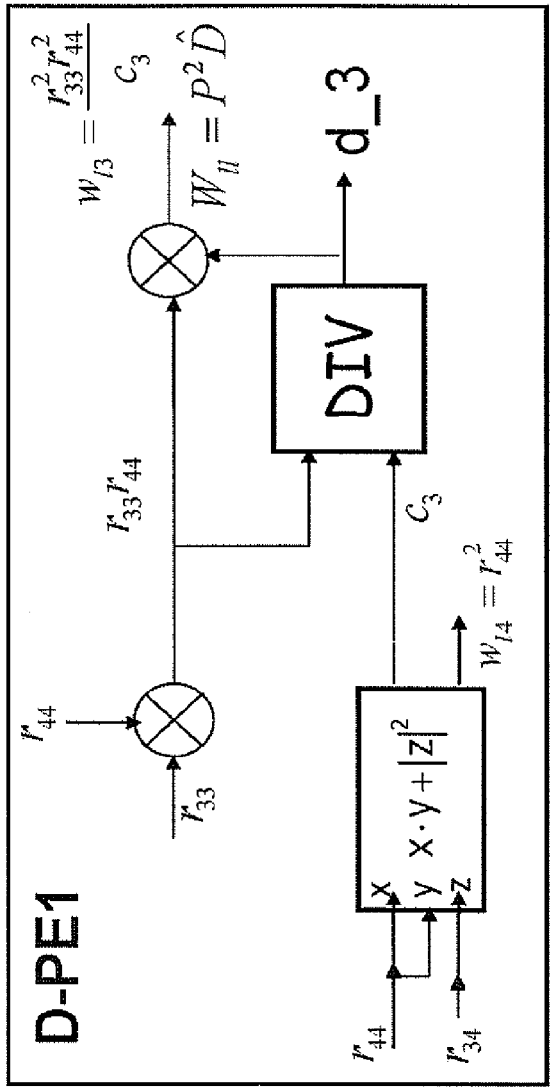
Figure 21:
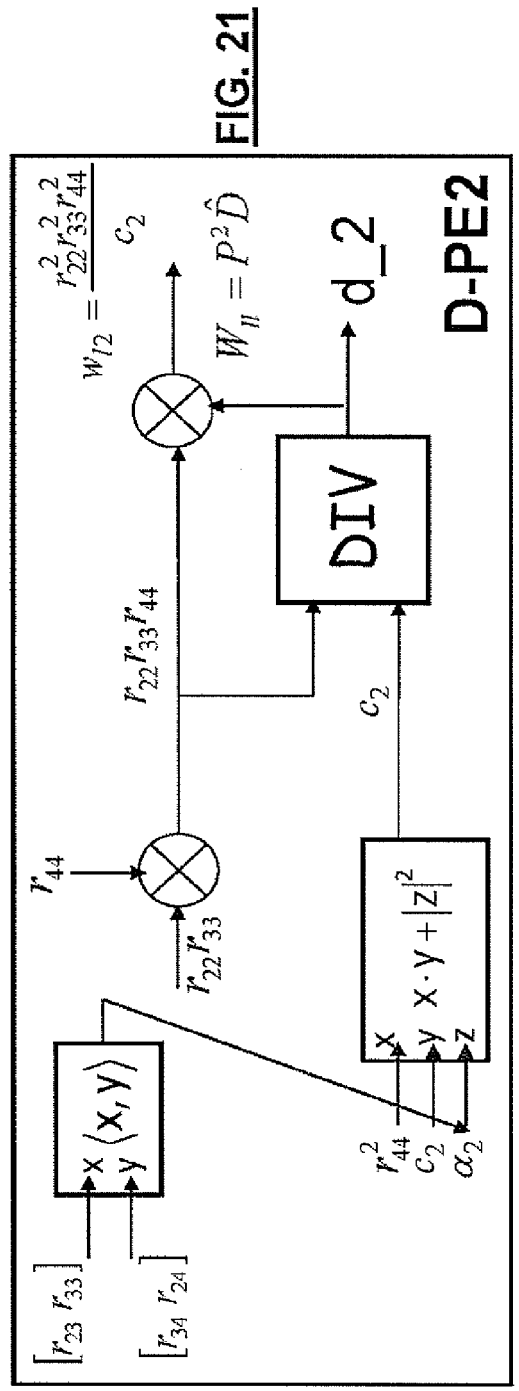
Figures 22, 23:
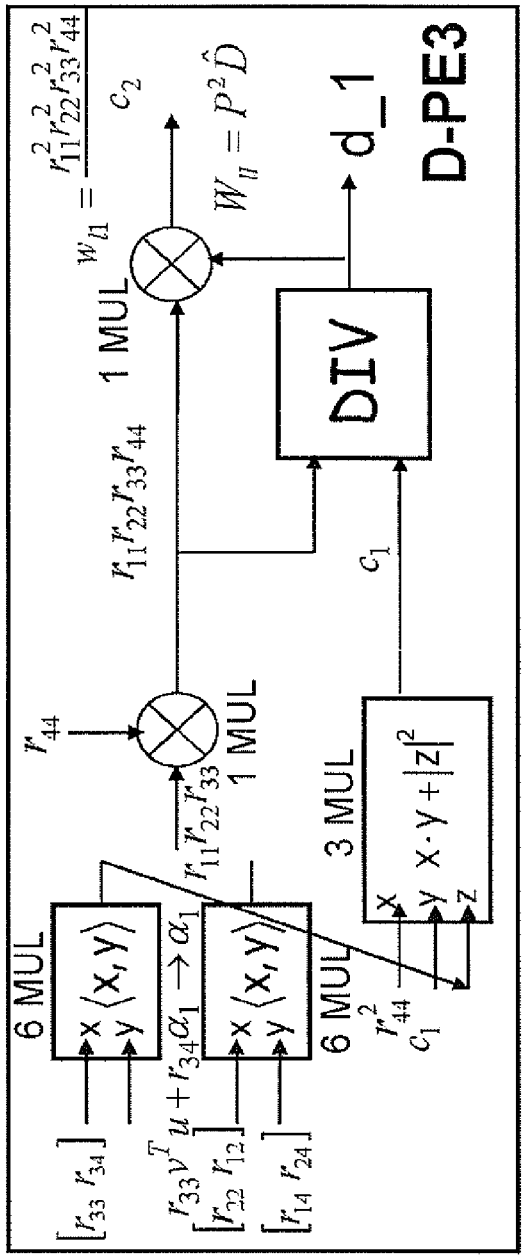

FIGS. 20-22 show D-matrix processing on D-PE1, D-PE2, and a third processing unit D-PE3 during fourth preamble processing for 4×4 MIMO. During the fourth preamble, the three processing units, D-PE1, D-PE2 and D-PE3, can operate in parallel and be configured to generate the output shown.

FIG. 23 shows which processing units D-PEi (D-PE1, D-PE2 and D-PE3) are active during the ith LTF preamble for a 4×4 MIMO system. These processing units perform distributed processing across tone preambles, which can be processed using tone interleaved HT-LTF in 4×4 MIMO. During the second preamble, four multiplies can be performed per tone. For the second preamble processing, only the first processing unit, D-PE1, need be active. For the third preamble processing, the two processing units, D-PE1 and D-PE2, can operate in parallel, and fifteen multiplies can be performed per tone (D-PE3 can remain inactive). For the fourth preamble processing, the three processing units, D-PE1, D-PE2 and D-PE3, can operate in parallel, and thirty three multiplies can be performed per tone.

Figure 24:
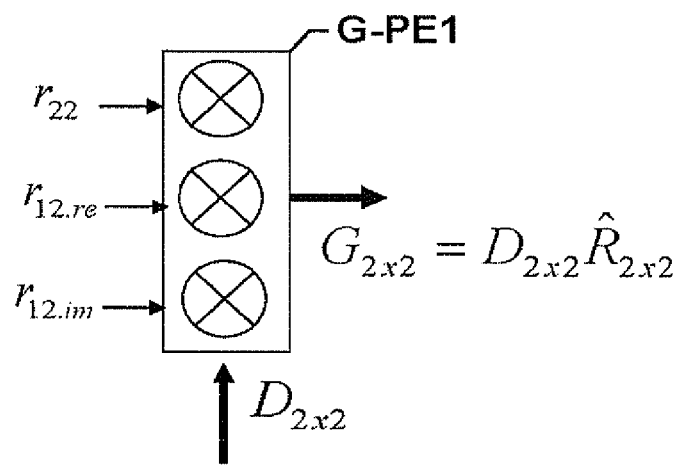
FIGS. 24-26 show example architecture and G-matrix processing for 2×2 MIMO, 3×3 MIMO and 4×4 MIMO.
Figure 25:
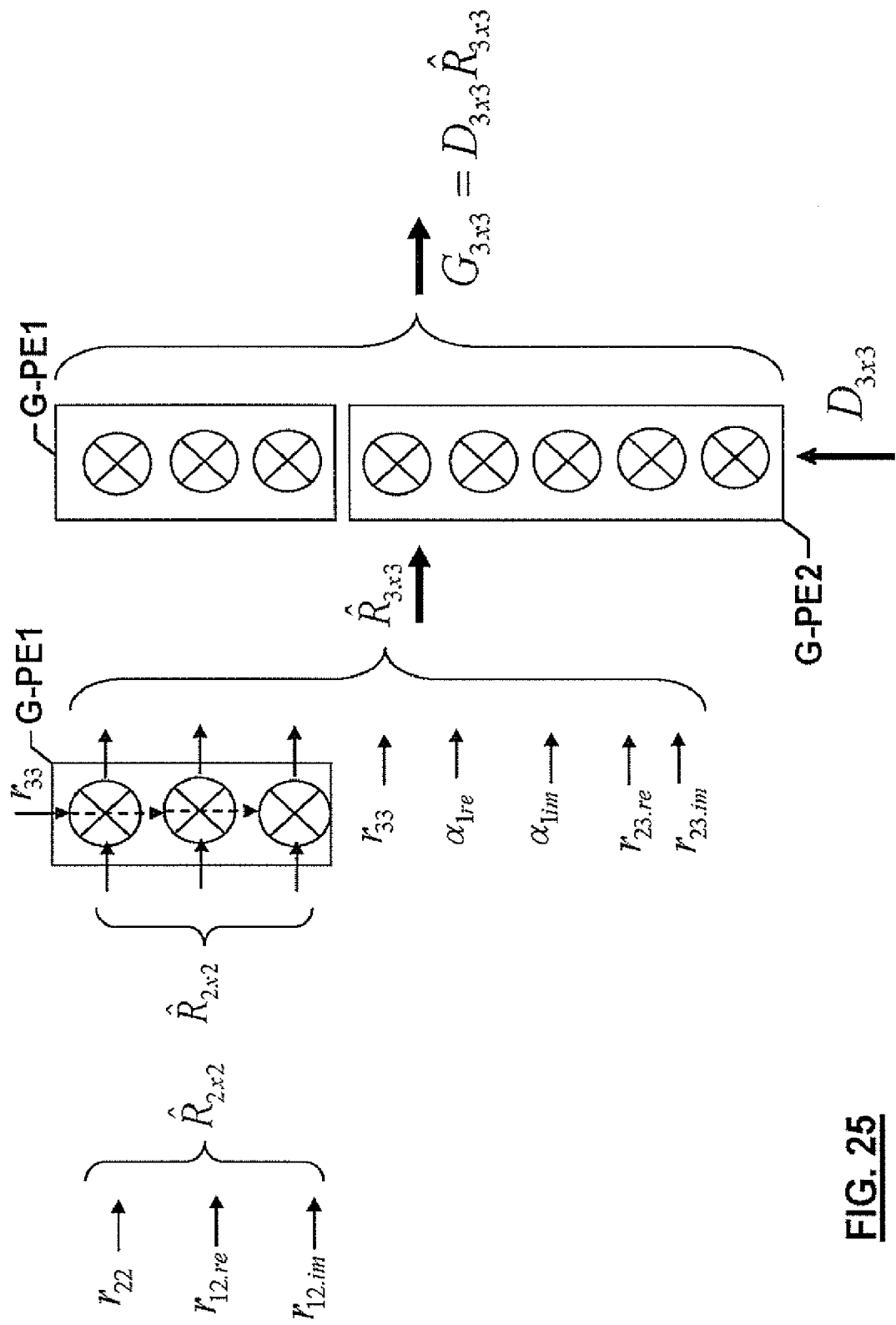
Figure 26:
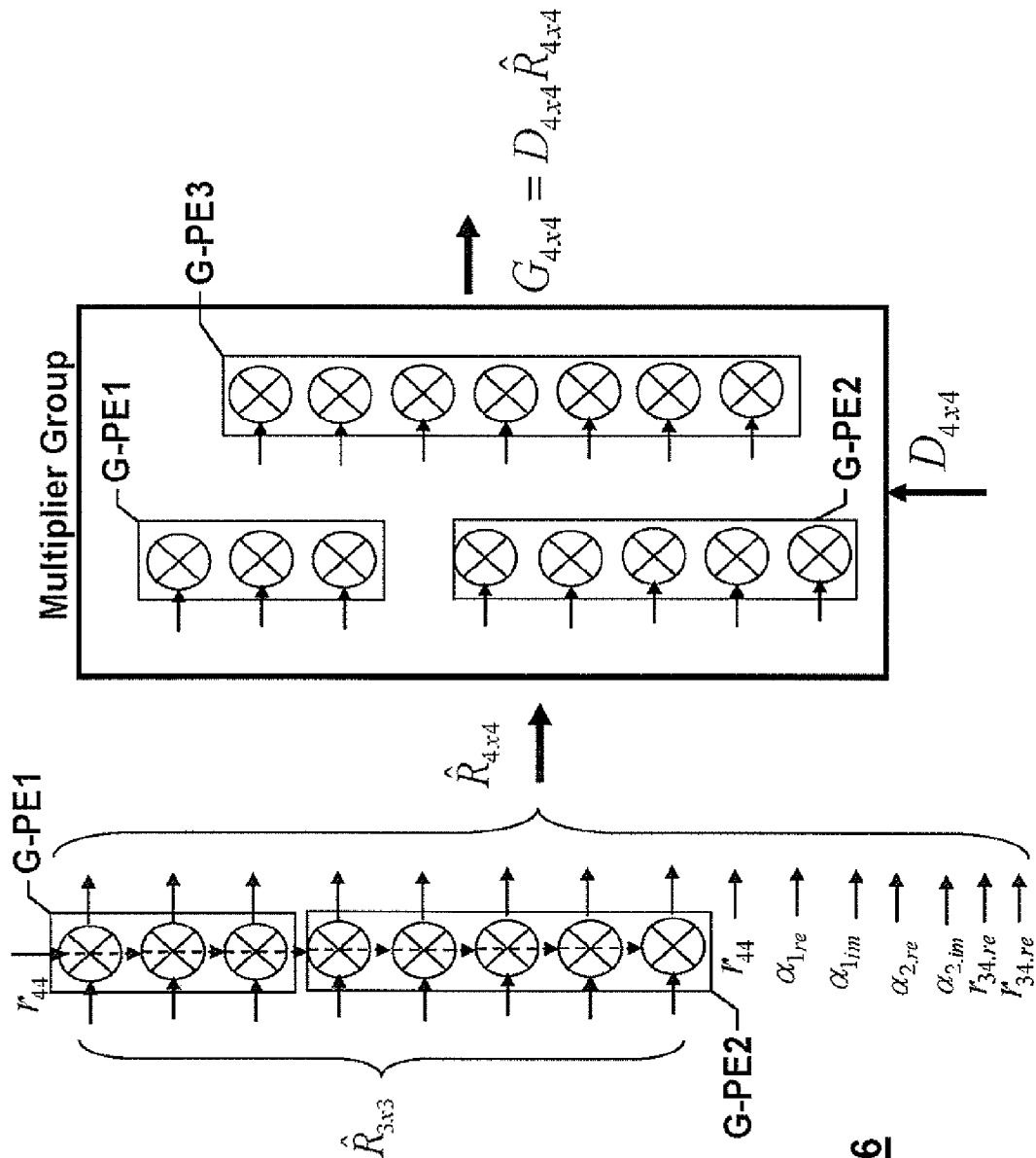

A similar recursive approach to computing the G matrix can also be employed. FIGS. 24-26 show example architecture and G-matrix processing for 2×2, 3×3 and 4×4 MIMO. For 2×2 and 2×3 MIMO, recall that the kernel matrix $$\hat{R}_{2\times 2} = \begin{bmatrix} r_{22} & -r_{12} \\ 0 & 1 \end{bmatrix}. \quad (20)$$

It can be seen that the degrees of freedom (DOF) of the matrices $\hat{R}_{n_r \times n_r}$ are $n_t^2 - 1$. Thus, for 2×2 and 2×3 MIMO, there are 3 DOF: three real multiplies to calculate the G matrix.

FIG. 24 shows G-matrix processing for 2×2 MIMO. There are 3 DOF for $\hat{R}_{2\times 2}$. A G matrix processing unit, G-PE1, includes three multipliers and operates on inputs, $r_{22}$, $r_{12,re}$, $R_{12,im}$ and $D_{2\times 2}$, to generate the $G_{2\times 2} = D_{2\times 2} \hat{R}_{2\times 2}$ output. Additionally, from $R_{2\times 2}$, subsequent $\hat{R}_{n_r \times n_t}$ matrices can be computed.

FIG. 25 shows G-matrix processing for 3×3 MIMO. $\hat{R}_{3\times 3}$ can be computed from $\hat{R}_{x2}$ as shown.

$$\hat{R}_{3\times 3} = \begin{bmatrix} r_{33} \hat{R}_{2\times 2} & \alpha_1 \\ & -r_{23} \\ 0 & 1 \end{bmatrix} \quad (21)$$

$\hat{R}_{3\times 3}$ has DOF 8, so a second processing unit, G-PE2, can be used in combination with G-PE1 to compute $G_{3\times 3} = D_{3\times 3} \hat{R}_{3\times 3}$. This G-matrix processing can be performed during the third preamble processing.

FIG. 26 shows G-matrix processing for 4×4 MIMO. $\hat{R}_{4\times 4}$ can be computed from $\hat{R}_{3\times 3}$ as shown.

$$\hat{R}_{4\times 4} = \begin{bmatrix} r_{44} \hat{R}_{3\times 3} & \alpha_1 \\ & \alpha_2 \\ 0 & -r_{34} \\ & 1 \end{bmatrix} \quad (22)$$

$\hat{R}_{4\times 4}$ has DOF 15, so a third processing unit, G-PE3, can be used in combination with G-PE1 and G-PE3 to compute $G_{4\times 4} = D_{4\times 4} \hat{R}_{4\times 4}$. This G-matrix processing can be performed during the fourth preamble processing.

The following table breaks down the hardware allocation for different MIMO modes in the example architecture described:

| MIMO MODE | 2 × 2 | 2 × 3 | 3 × 3 | 4 × 4 |
|---|---|---|---|---|
| CORDIC processors | 3 | 3 | 3 | 6 |
| DIV units | 1 | 1 | 2 | 3 |
| D-Matrix (last preamble processing) | D-PE1 5 MUL | D-PE1 5 MUL | D-PE1 D-PE2 16 MUL | D-PE1 D-PE2 D-PE3 33 MUL |
| G-Matrix | G-PE1 3 MUL | G-PE1 3 MUL | G-PE1 G-PE2 11 MUL | G-PE1 G-PE2 G-PE3 23 MUL |
| Total MUL units | 8 | 8 | 27 | 56 |

Although separate processing units (D-PE1, D-PE2, D-PE3, G-PE1, G-PE2, and G-PE3) are shown and described in connection with the calculations of D and G matrices, it will be appreciated that these processing units need not be discrete components and may be integrated into one or more units.

The following table summarizes the number of computations for the last preamble processing and DATA field in the example architecture described:

| MIMO MODE | 2 × 2 | 2 × 3 | 3 × 3 | 3 × 4 | 4 × 4 |
|---|---|---|---|---|---|
| Last Preamble CORDIC ops | 5 | 11 | 12 | 20 | 22 |
| Last Preamble MUL ops | 8 | 8 | 27 | 56 | 56 |
| DATA field CORDIC ops | 5 | 11 | 12 | 20 | 22 |
| DATA field MUL ops | 8 | 8 | 18 | 32 | 32 |

Moreover, the G-PE processing units can be reused for the G matrix equalization, $\hat{x} = G \cdot z$, during DATA processing.

Figure 27:
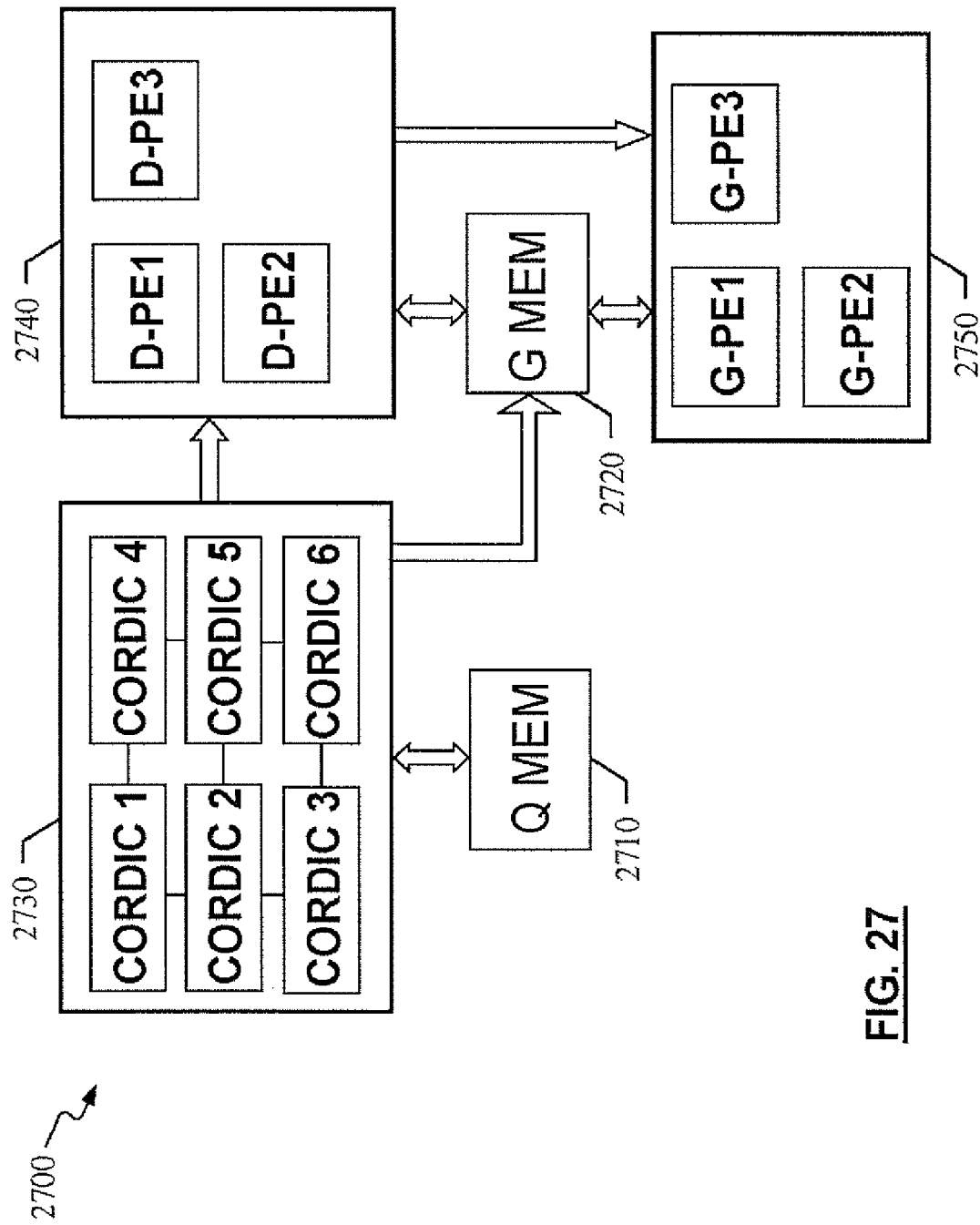
FIG. 27 shows an example architectural arrangement for a scalable MIMO equalizer.

FIG. 27 shows an example architectural arrangement 2700 for a scalable MIMO equalizer. In this example, the D-PE and G-PE processing units are disjoint. Also, in this example, a CORDIC module 2730 includes six CORDIC processors, which can operate as a CORDIC pipeline; a D-PE module 2740 and a G-PE module 2750 can also be included.

An example 4×4 MIMO mode is described in connection with FIG. 27. During the first LTF processing in 4×4 MIMO, the output of CORDIC processors 1-6 can be stored in Q memory 2710, and $r_{11}$ can be stored in G memory 2720. During second LFT processing, the output of CORDIC processors 1-6 can be stored in Q memory 2710, $r_{22}$ can be stored in G memory 2720, and D-PE1 can perform its initial calculations, the results of which can also be stored in G memory 2720.

During the third LFT processing, the output of CORDIC processors 1-6 can be stored in Q memory 2710, $r_{33}$ can be stored in G memory 2720, and D-PE1 and D-PE2 can perform their calculations in parallel, storing their results in G memory 2720. In addition, G-PE1 can perform its initial calculations, and $\hat{R}_{3\times 3}$ can be stored in the G memory 2720.

During the fourth LFT processing, the output of CORDIC processors 1-6 can be stored in Q memory 2710, and the D-PE units 1-3 can perform their calculations in parallel to provide $\hat{D}$ to the G-PE units. In addition, the G-PE units can store $\hat{R}_{4\times 4}$ in the G memory 2720 and calculate $G_{4\times 4}$. Then, during data processing, the Q matrix is available from the Q memory 2710 and the G matrix is available from the G memory 2720.

This architecture can also readily be used for MIMO modes of 2×2, 2×3, 3×3, and 3×4. In addition, because six CORDIC processor are included for the 4×4 MIMO mode, these CORDIC processors can be used in parallel in the other modes (e.g., as dual, parallel CORDIC pipelines in 2×3 MIMO mode) to further accelerate the processing.

When integrating these processing units and memories on chip, the present systems and techniques can result in reduced area needed to handle MIMO modes using more antennas. The following table provides estimates of area for integrated circuit implementation of an equalizer that can process MIMO modes up to 2×3, 3×3 and 4×4;

| Module | Area 2 × 3 (Lambda^2) | Area 3 × 3 (Lambda^2) | Area 4 × 4 (Lambda^2) |
|---|---|---|---|
| CORDIC proc | 111000000 | 111000000 | 2 × 111000000 |
| MUL Group | 70000000 | 3 × 70000000 | 7 × 70000000 |

-continued

| Module | Area 2 × 3 (Lambda^2) | Area 3 × 3 (Lambda^2) | Area 4 × 4 (Lambda^2) |
|---|---|---|---|
| Q Memory | 48000000 | 1.25 × 48000000 | 2 × 48000000 |
| G Memory | 54000000 | 2 × 54000000 | 3.3 × 54000000 |
| DIV area | 20000000 | 2 × 20000000 | 3 × 20000000 |
| MEQ Ctr | 7000000 | 1.5 × 7000000 | 2 × 7000000 |
| Q Mem Ctr | 4000000 | 1.5 × 4000000 | 2 × 4000000 |
| R Mem Ctr | 2700000 | 1.5 × 2700000 | 2 × 2700000 |
| Total | 316000000 | 5500000000 | 10060000000 |

(MEQ=Matrix Equalizer; Mem=Memory; Ctr=Control) Based on this area comparison analysis, there is approximately a 75% increase in area from 2×3 to 3×3, and approximately a 300% increase in area from 2×3 to 4×4.

Figure 28B:
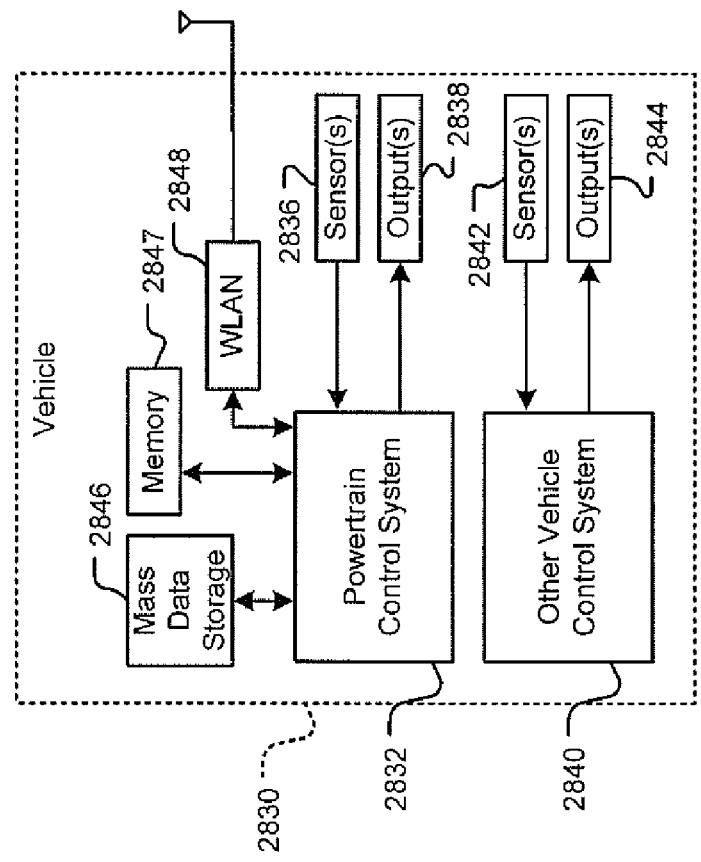
FIGS. 28A-28E show various exemplary implementations of the described systems and techniques.
Figure 28A:
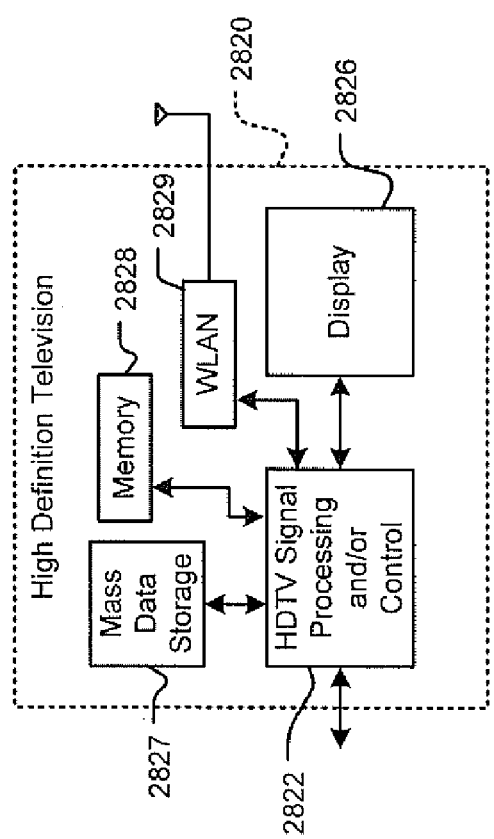

FIGS. 28A-28E show various exemplary implementations of the described systems and techniques. Referring now to FIG. 28A, the described systems and techniques can be implemented in a high definition television (HDTV) 2820. The described systems and techniques may be implemented in either or both signal processing and/or control circuits, which are generally identified in FIG. 28A at 2822, a WLAN (wireless local-area network) interface and/or mass data storage of the HDTV 2820. The HDTV 2820 receives HDTV input signals in either a wired or wireless format and generates HDTV output signals for a display 2826. In some implementations, signal processing circuit and/or control circuit 2822 and/or other circuits (not shown) of the HDTV 2820 may process data, perform coding and/or encryption, perform calculations, format data and/or perform any other type of HDTV processing that may be required.

The HDTV 2820 may communicate with mass data storage 2827 that stores data in a nonvolatile manner such as optical and/or magnetic storage devices. The mass data storage 2827 may be a hard disk drive (HDD), such as a mini HDD that includes one or more platters having a diameter that is smaller than approximately 1.8". The HDTV 2820 may be connected to memory 2828 such as random access memory (RAM), read only memory (ROM), low latency nonvolatile memory such as flash memory and/or other suitable electronic data storage. The HDTV 2820 also may support connections with a WLAN via a WLAN network interface 2829.

Referring now to FIG. 28B, the described systems and techniques implement a control system of a vehicle 2830, a WLAN interface and/or mass data storage of the vehicle control system. In some implementations, the described systems and techniques implement a powertrain control system 2832 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The described systems and techniques may also be implemented in other control systems 2840 of the vehicle 2830. The control system 2840 may likewise receive signals from input sensors 2842 and/or output control signals to one or more output devices 2844. In some implementations, the control system 2840 may be part of an anti-lock braking system (ABS), a navigation system, a telematics system, a vehicle telematics system, a lane departure system, an adaptive cruise control system, a vehicle entertainment system such as a stereo, digital versatile disc (DVD), compact disc and the like. Still other implementations are contemplated.

The powertrain control system 2832 may communicate with mass data storage 2846 that stores data in a nonvolatile manner. The mass data storage 2846 may include optical and/or magnetic storage devices for example hard disk drives (HDD) and/or DVDs. The HDD may be a mini HDD that includes one or more platters having a diameter that is smaller than approximately 1.8". The powertrain control system 2832 may be connected to memory 2847 such as RAM, ROM, low latency nonvolatile memory such as flash memory and/or other suitable electronic data storage. The powertrain control system 2832 also may support connections with a WLAN via a WLAN network interface 2848. The control system 2840 may also include mass data storage, memory and/or a WLAN interface (all not shown).

Figure 28C:
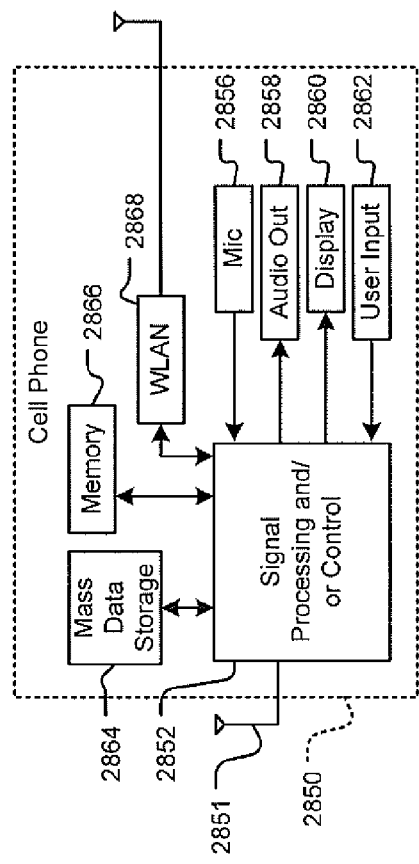

Referring now to FIG. 28C, the described systems and techniques can be implemented in a cellular phone 2850 that may include a cellular antenna 2851. The described systems and techniques may be implemented in either or both signal processing and/or control circuits, which are generally identified in FIG. 28C at 2852, a WLAN interface and/or mass data storage of the cellular phone 2850. In some implementations, the cellular phone 2850 includes a microphone 2856, an audio output 2858 such as a speaker and/or audio output jack, a display 2860 and/or an input device 2862 such as a keypad, pointing device, voice actuation and/or other input device. The signal processing and/or control circuits 2852 and/or other circuits (not shown) in the cellular phone 2850 may process data, perform coding and/or encryption, perform calculations, format data and/or perform other cellular phone functions.

The cellular phone 2850 may communicate with mass data storage 2864 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 2850 may be connected to memory 2866 such as RAM, ROM, low latency nonvolatile memory such as flash memory and/or other suitable electronic data storage. The cellular phone 2850 also may support connections with a WLAN via a WLAN network interface 2868.

Figure 28D:
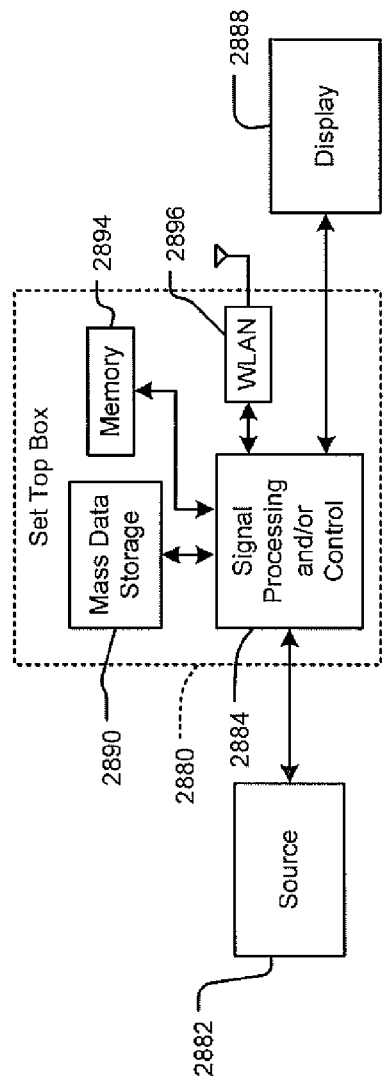

Referring now to FIG. 28D, the described systems and techniques can be implemented in a set top box 2880. The described systems and techniques may be implemented in either or both signal processing and/or control circuits, which are generally identified in FIG. 28D at 2884, a WLAN interface and/or mass data storage of the set top box 2880. The set top box 2880 receives signals from a source 2882 such as a broadband source and outputs standard and/or high definition audio/video signals suitable for a display 2888 such as a television and/or monitor and/or other video and/or audio output devices. The signal processing and/or control circuits 2884 and/or other circuits (not shown) of the set top box 2880 may process data, perform coding and/or encryption, perform calculations, format data and/or perform any other set top box function.

The set top box 2880 may communicate with mass data storage 2890 that stores data in a nonvolatile manner. The mass data storage 2890 may include optical and/or magnetic storage devices for example hard disk drives HDD and/or DVDs. The HDD may be a mini HDD that includes one or more platters having a diameter that is smaller than approximately 1.8". The set top box 2880 may be connected to memory 2894 such as RAM, ROM, low latency nonvolatile memory such as flash memory and/or other suitable electronic data storage. The set top box 2880 also may support connections with a WLAN via a WLAN network interface 2896.

Figure 28E:
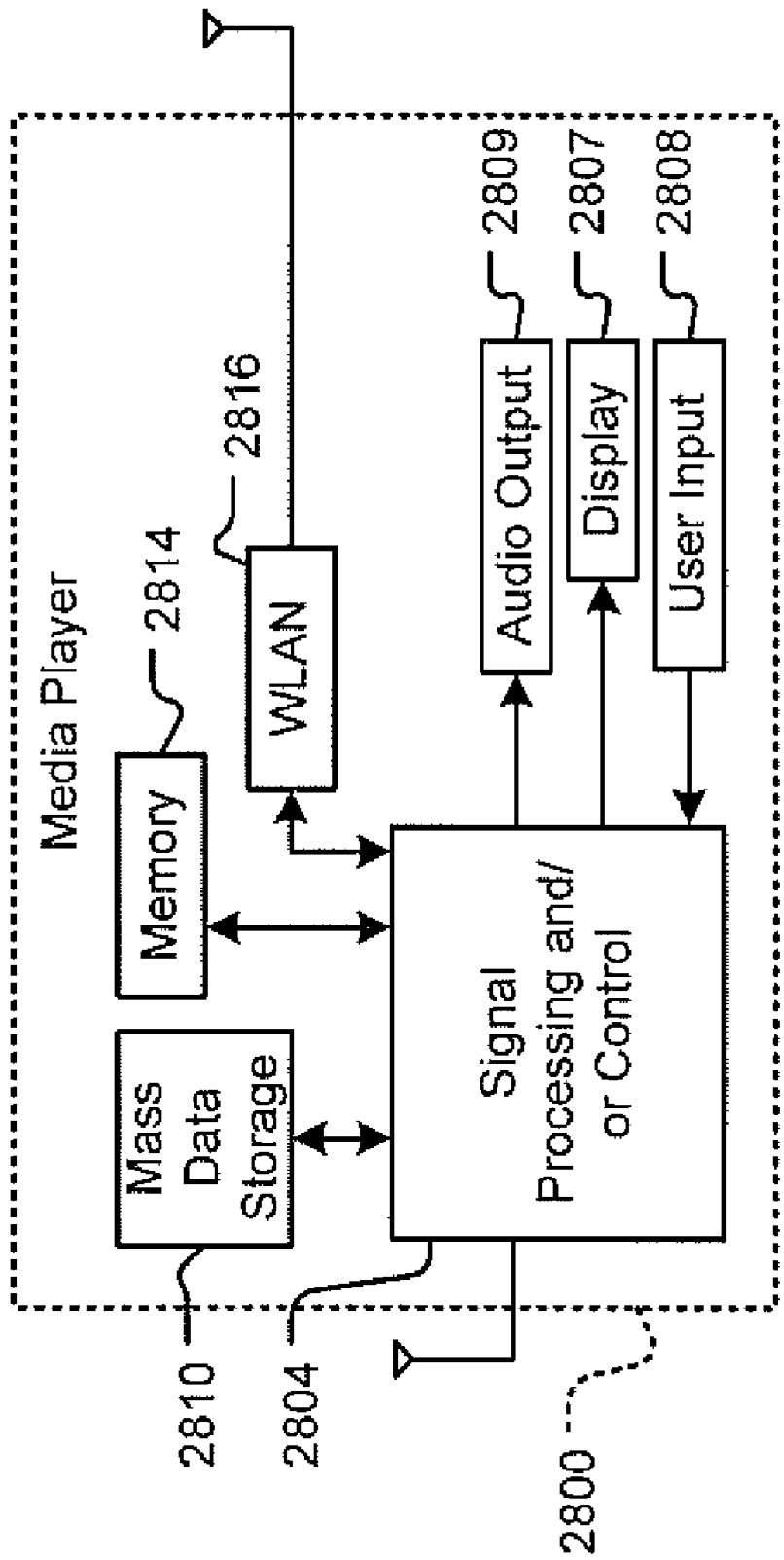

Referring now to FIG. 28E, the described systems and techniques can be implemented in a media player 2800. The described systems and techniques may be implemented in either or both signal processing and/or control circuits, which are generally identified in FIG. 28E at 2804, a WLAN interface and/or mass data storage of the media player 2800. In some implementations, the media player 2800 includes a display 2807 and/or a user input 2808 such as a keypad, touchpad and the like. In some implementations, the media player 2800 may employ a graphical user interface (GUI) that typically employs menus, drop down menus, icons and/or a point-and-click interface via the display 2807 and/or user input 2808. The media player 2800 further includes an audio output 2809 such as a speaker and/or audio output jack. The signal processing and/or control circuits 2804 and/or other circuits (not shown) of the media player 2800 may process data, perform coding and/or encryption, perform calculations, format data and/or perform any other media player function.

The media player 2800 may communicate with mass data storage 2810 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 2800 may be connected to memory 2814 such as RAM, ROM, low latency nonvolatile memory such as flash memory and/or other suitable electronic data storage. The media player 2800 also may support connections with a WLAN via a WLAN network interface 2816. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a software program operable to cause one or more machines to perform the operations described (such as a program encoded in a computer-readable medium, which can be a memory, a storage device or a communications channel). It will be appreciated that the order of operations presented is shown only for the purpose of clarity in this description. The particular order of operations shown may not be required, and some or all of the operations may occur simultaneously in various implementations. Moreover, not all of the operations shown need be performed to achieve desirable results.

Other embodiments fall within the scope of the following claims.

What is claimed is:

1. An apparatus comprising:
    an input configured to receive data that has been transmitted over a wireless channel using multiple transmit antennas, $n_t$, and received using multiple receive antennas, $n_r$; and
    an equalizer responsive to multiple data streams corresponding to the multiple receive antennas and configured to generate an equalization matrix, $G_{n_t \times n_r}$, using a recursively updated kernel matrix, wherein equalization matrix generation is distributed over time by updating the equalization matrix during preamble processing.

2. The apparatus of claim 1, wherein the input is responsive to a selectable number of at least four antennas in an orthogonal frequency division multiplexed (OFDM) multiple-in-multiple-out (MIMO) system, and the equalizer is configured to distribute kernel matrix updates across multiple Long Training Fields (LTFs) of data preambles.

3. The apparatus of claim 2, wherein the equalizer comprises:
    coordinate rotation digital computer (CORDIC) processors configured to perform Givens rotations on a channel response matrix;
    memory configured to store equalization matrices, including $G_{n_t \times n_r}$;
    first processing units configured to update the kernel matrix; and
    second processing units configured to generate the equalization matrix, $G_{n_t \times n_r}$.

4. The apparatus of claim 3, wherein the Givens rotations are scheduled on the CORDIC processors to intersperse calculations of $\phi$ and $\theta$ angles.

5. The apparatus of claim 3, wherein the memory comprises a Q matrix memory and a G matrix memory.

6. The apparatus of claim 3, wherein the CORDIC processors comprise six CORDIC processors configured to operate as a single CORDIC pipeline when the multiple data streams comprise a first number of data streams and configured to operate as dual, parallel CORDIC pipelines when the multiple data streams comprise a second number of data streams less than the first number.

7. The apparatus of claim 3, wherein the second processing units are configured to be used both during preamble processing to generate the equalization matrix, G, and during data processing to perform G matrix equalization, $\hat{x} = G \cdot z$.

8. The apparatus of claim 1, wherein the kernel matrix is updated from $n_{(t-i)} \times n_{(r-j)}$ to $n_t \times n_r$, t and r are integers greater than three, and i and j are integers greater than one.

9. The apparatus of claim 1, wherein the equalizer is arranged to be reconfigurable to handle the multiple data streams changing from a first number of data streams to a second number of data streams.

10. A system comprising:
    a first device including a first wireless transceiver and multiple antennas; and
    a second device including a second wireless transceiver and multiple antennas, the second device being a mobile device operable to communicate with the first device over a wireless channel;
    wherein the second wireless transceiver includes an input configured to receive data that has been transmitted and received over the wireless channel using the multiple antennas of the first device and the multiple antennas of the second device, respectively, and the second wireless transceiver includes an equalizer responsive to multiple data streams of the received data and configured to generate an equalization matrix using a recursively updated kernel matrix, wherein equalization matrix generation is distributed over time by updating the equalization matrix during preamble processing.

11. The system of claim 10, wherein the system is an orthogonal frequency division multiplexed (OFDM) multiple-in-multiple-out (MIMO) system, the input is responsive to a selectable number of at least four antennas, and the equalizer is configured to distribute kernel matrix updates across multiple Long Training Fields (LTFs) of data preambles.

12. The system of claim 11, wherein the equalizer comprises:
- coordinate rotation digital computer (CORDIC) processors configured to perform Givens rotations on a channel response matrix;
- memory configured to store equalization matrices;
- first processing units configured to update the kernel matrix; and
- second processing units configured to generate the equalization matrix.

13. The system of claim 12, wherein the Givens rotations are scheduled on the CORDIC processors to intersperse calculations of $\phi$ and $\theta$ angles.

14. The system of claim 12, wherein the memory comprises a Q matrix memory and a G matrix memory.

15. The system of claim 12, wherein the CORDIC processors comprise six CORDIC processors configured to operate as a single CORDIC pipeline when the multiple data streams comprise a first number of data streams and configured to operate as dual, parallel CORDIC pipelines when the multiple data streams comprise a second number of data streams less than the first number.

16. The system of claim 12, wherein the second processing units are configured to be used both during preamble processing to generate the equalization matrix, and during data processing to perform matrix equalization.

17. The system of claim 10, wherein the equalizer is arranged to be reconfigurable to handle the multiple data streams changing from a first number of data streams to a second number of data streams.

18. A device comprising:
- means for receiving data that has been transmitted over a wireless channel using multiple transmit antennas and multiple receive antennas; and
- means for beginning computation of an equalization matrix after a first of multiple Long Training Fields (LTFs) of data preambles have been received, but before a last LTF of the multiple LTFs is received, the equalization matrix being for processing the data.

19. The device of claim 18, wherein the means for beginning computation comprises:
- first means for updating a kernel matrix used to compute the equalization matrix; and
- second means for generating the equalization matrix.

20. The device of claim 18, wherein the means for beginning computation comprises means for scheduling Givens rotations on coordinate rotation digital computer (CORDIC) processors to intersperse calculations of $\phi$ and $\theta$ angles.

* * * * *